(12) United States Patent
Nandi et al.

(10) Patent No.: US 10,896,329 B2
(45) Date of Patent: Jan. 19, 2021

(54) METHOD FOR PERFORMING AND VISUALIZING ANALYTICS OPERATIONS OVER DATA USING AUGMENTED REALITY

(71) Applicant: Ohio State Innovation Foundation, Columbus, OH (US)

(72) Inventors: Arnab Nandi, Columbus, OH (US); Codi Burley, Grove City, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 16/548,384

(22) Filed: Aug. 22, 2019

(65) Prior Publication Data
US 2020/0125848 A1 Apr. 23, 2020

Related U.S. Application Data

(60) Provisional application No. 62/748,963, filed on Oct. 22, 2018.

(51) Int. Cl.
| | | |
|---|---|---|
| G06K 9/00 | (2006.01) | |
| G06F 9/451 | (2018.01) | |
| G06F 3/01 | (2006.01) | |
| G06F 3/0481 | (2013.01) | |
| G06T 19/00 | (2011.01) | |
| G06F 3/0484 | (2013.01) | |
| G06T 7/246 | (2017.01) | |

(52) U.S. Cl.
CPC ......... *G06K 9/00671* (2013.01); *G06F 3/017* (2013.01); *G06F 3/0484* (2013.01); *G06F 3/04815* (2013.01); *G06F 9/451* (2018.02); *G06K 9/00449* (2013.01); *G06T 7/246* (2017.01); *G06T 19/006* (2013.01); *G06K 2209/01* (2013.01); *G06T 2207/10016* (2013.01); *G06T 2207/20164* (2013.01); *G06T 2207/30176* (2013.01)

(58) Field of Classification Search
CPC .................................................. G06K 9/00671
USPC ......................................................... 715/863
See application file for complete search history.

(56) References Cited

U.S. PATENT DOCUMENTS

| 5,237,620 A | 8/1993 | Deaton et al. | |
| 10,360,238 B1 * | 7/2019 | O'Brien | G06F 16/25 |
| 10,452,915 B1 * | 10/2019 | Chikkaveerappa | G07C 5/085 |

(Continued)

OTHER PUBLICATIONS

R. Azuma et al. Recent advances in augmented reality. IEEE CG&A, 2001, 34-47.

(Continued)

*Primary Examiner* — Reza Nabi
(74) *Attorney, Agent, or Firm* — Meunier Carlin & Curfman LLC

(57) ABSTRACT

The exemplified system and method facilitates process, grammar, and framework to perform analytics operations, and visualize the result of analytics operations using augmented reality. The exemplified system and method can be used, but is not limited to, for augmented reality presentations of physical objects as paper documents, digital or printed signage, posters, physical or digital displays, real-world objects, indoor and outdoor spaces, hardware device displays, vehicle dashboards, and other real-world scenes.

19 Claims, 16 Drawing Sheets

(56) References Cited

U.S. PATENT DOCUMENTS

| | | | |
|---|---|---|---|
| 2004/0109009 A1* | 6/2004 | Yonezawa | G06T 15/20 345/632 |
| 2013/0035581 A1 | 2/2013 | Vesto | |
| 2014/0204118 A1* | 7/2014 | Berry | G06T 11/00 345/633 |
| 2016/0049010 A1* | 2/2016 | Hinski | G06T 19/006 345/633 |
| 2017/0116784 A1* | 4/2017 | Hintermeister | G06K 9/00671 |
| 2018/0089188 A1* | 3/2018 | Kharisma | G06F 16/2477 |
| 2018/0218045 A1* | 8/2018 | Pal | G06F 16/24564 |
| 2019/0236844 A1* | 8/2019 | Balasian | G06T 11/60 |
| 2019/0279284 A1* | 9/2019 | Sunday | G06Q 30/0643 |
| 2020/0089946 A1* | 3/2020 | Mallick | G06K 9/00463 |

OTHER PUBLICATIONS

J. Baker, D. Jones, and J. Burkman. Using visual representations of data to enhance sensemaking in data exploration tasks. JAIS, 2009, 533-559.

Bernardes, J., Tori, R., Nakamura, R., Calife, D., Tomoyose, A.: Augmented Reality Games. In: Olli, L., Wirman, H., Fernandez, A. (eds.) Extending Experiences: Structure, Analysis and Design of Computer Game Player Experience, pp. 29-43. Lapland University Press, Rovaniemi (2008), 17 pages.

S. K. Card, T. P. Moran, and A. Newell. The keystroke-level model for user performance time with interactive systems. CACM, 1980, 396-410.

Chabot, C., Stolte, C. & Hanrahan, P. Tableau Software. Available at http://www.tableau.com (2003). 9 pages.

K. Chen et al. Shreddr: pipelined paper digitization for low-resource organizations. ACM DEV, 2012, 10 pages.

A. Crotty, A. Galakatos, E. Zgraggen, C. Binnig, and T. Kraska. Vizdom: interactive analytics through pen and touch. VLDB, 2015, 4 pages.

Q. Dong. Skip the line: restaurant wait times on Search and Maps. Google Blog, 2017, 3 pages.

K.-S. Fu and J. Mui. A survey on image segmentation. Pattern Recognition, 1981, vol. 13, 3-16.

H. Fuchs et al. Augmented reality visualization for laparoscopic surgery. MICCAI, 1998, 10 pages.

P. Hanrahan. VizQL: A Language for Query, Analysis and Visualization. SIGMOD, 2006, 1 page.

A. Henrysson and M. Ollila. Umar: Ubiquitous mobile augmented reality. MUM, 2004, 5 pages.

S. Idreos and E. Liarou. dbTouch: Analytics at your Fingertips. CIDR, 2013, 11 pages.

L. Jiang, P. Rahman, and A. Nandi. Evaluating Interactive Data Systems: Workloads, Metrics, and Guidelines. SIGMOD, 2018, 8 pages.

M. Khan, L. Xu, A. Nandi, and J. M. Hellerstein. Data tweening: incremental visualization of data transforms. VLDB, 2017, 12 pages.

A. Nandi. Querying Without Keyboards. CIDR, 2013, 4 pages.

A. Nandi, L. Jiang, and M. Mandel. Gestural query specification. VLDB, 2013, 12 pages.

J. M. Rzeszotarski and A. Kittur. Kinetica: naturalistic multi-touch data visualization. SIGCHI, 2014, 10 pages.

C. Stolte, D. Tang, and P. Hanrahan. Polaris: A system for query, analysis, and visualization of multidimensional relational databases. TVCG, 2002, 14 pages.

R. Szeliski. Computer vision: algorithms and applications. 2010, 874 pages. (provided in 3 parts).

C. Wang et al. ARShop: a cloud-based augmented reality system for shopping. VLDB, 2017, 4 pages.

H. Wickham. A layered grammar of graphics. Computational & Graphical Statistics, 2010, 26 pages.

S. Wu et al. Fonduer: Knowledge base construction from richly formatted data. SIGMOD, 2018, 1301-1316. C. Zhang.

C. Zhang. DeepDive: a data management system for automatic knowledge base construction. Madison, Wisconsin: University of Wisconsin-Madison, 2015, 205 pages.

E. Zhu, A. Hadadgar, I. Masiello, and N. Zary. Augmented reality in healthcare education: an integrative review. PeerJ, 2014, 17 pages.

\* cited by examiner

SELECT * FROM Products

| Product Name | Supplier ID | Unit | Price |
|---|---|---|---|
| Chais | 1 | 10 boxes x 20 bags | 18 |
| Ikura | 4 | 12 - 200 ml jars | 31 |
| Chang | 1 | 24 - 12 oz bottles | 19 |
| Syrup | 1 | 12 - 550 ml bottles | 10 |
| Kobe Niku | 4 | 18 - 500 g pkgs. | 97 |
| Konbu | 6 | 2 kg box | 6 |
| Tofu | 6 | 40 - 100 g pkgs. | 23.25 |
| Geitost | 15 | 500 g | 2.5 |

FIG. 5A

SELECT * FROM Products ORDER BY Price

| Product Name | Supplier ID | Unit | Price |
|---|---|---|---|
| Chais | 1 | 10 boxes x 20 bags | 18 |
| Ikura | 4 | 12 - 200 ml jars | 31 |
| Chang | 1 | 24 - 12 oz bottles | 19 |
| Syrup | 1 | 12 - 550 ml bottles | 10 |
| Kobe Niku | 4 | 18 - 500 g pkgs. | 97 |
| Konbu | 6 | 2 kg box | 6 |
| Tofu | 6 | 40 - 100 g pkgs. | 23.25 |
| Geitost | 15 | 500 g | 2.5 |

FIG. 5B

SELECT "Product Name" FROM Products WHERE Price<15

| Product Name | Supplier ID | Unit | Price |
|---|---|---|---|
| Syrup | | | |
| Konbu | | | |
| Geitost | | | |

FIG. 5C

SELECT * FROM Products GROUP BY "Supplier ID"

| Product Name | Supplier ID | Unit | Price |
|---|---|---|---|
| Chang | 1 | 10 boxes x 20 bags | 18 |
| Ikura | 4 | 12 - 200 ml jars | 31 |
| Chang | 1 | 24 - 12 oz bottles | 19 |
| Syrup | 1 | 12 - 550 ml bottles | 10 |
| Kobe Niku | 4 | 18 - 500 g pkgs. | 97 |
| Konbu | 6 | 2 kg box | 6 |
| Tofu | 6 | 40 - 100 g pkgs. | 23.25 |
| Geitost | 15 | 500 g | 2.5 |

| AVG(Price) | | | |
|---|---|---|---|
| | 14.75 | | 15.66 |
| | 2.5 | | 64 |

FIG. 5D

SELECT * FROM Products GROUP BY "Supplier ID" HAVING AVG(Price) > 15

| Product Name | Supplier ID | Unit | Price | AVG(Price) ↓ |
|---|---|---|---|---|
| Chais | 1 | 10 boxes x 20 bags | 18 | 15.6 |
| Ikura | 4 | 12 - 200 ml jars | 31 | 64 |
| Chang | 1 | 24 - 12 oz bottles | 19 | 15.6 |
| Syrup | 1 | 12 - 550 ml bottles | 10 | 15.6 |
| Kobe Niku | 4 | 18 - 500 g pkgs | 97 | 64 |

*FIG. 7*

METHOD FOR PERFORMING AND VISUALIZING ANALYTICS OPERATIONS OVER DATA USING AUGMENTED REALITY

RELATED APPLICATION

This application claims priority to, and the benefit of, U.S. Provisional Application No. 62/748,963, filed Oct. 22, 2018, entitled "Method for Performing and Visualizing Analytics Operations over Data using Augmented Reality," which is incorporated by reference herein in its entirety.

GOVERNMENT LICENSED RIGHTS

This invention was made with government support under Grant Nos. 1527779 and 1453582 awarded by the National Science Foundation. The government has certain rights in the invention.

BACKGROUND

There is a vast amount of data present in the real-world. With recent advances in computer vision, camera-enabled mobile devices, and cloud services, there is a tremendous opportunity to augment structured data in the real-world around a person with analytical insights. Coinciding with these technology trends, the number of data-rich, end-user activities is also rapidly increasing.

It would be beneficial to have data exploration and analysis in augmented and mixed reality computing environment.

SUMMARY

The exemplified system and method facilitate a process, a visualization grammar schema, and a framework to perform analytic operations of structured data in the real-world and to provide visualization of such analytics in an augmented reality environment (also referred to as an augmented reality computing environment). As used herein, the term "augmented reality" refers to the superimposition of a computer-generated image on a user's view of the real world, thus providing a composite view of that real-world view. The exemplified system and method can be used for, but is not limited to, augmented reality presentations of physical/tangible objects such as paper documents, digital or printed signage, posters, physical or digital displays, real-world objects, indoor and outdoor spaces, hardware device displays, vehicle dashboards, and other real-world scenes.

In some embodiments, the exemplified system and method are implemented in an augmented reality query system (also referred to as "ARQuery"). The exemplified system employs an augmented reality framework that facilitates querying over real-world data. The exemplified system also provides interaction and visualization grammar (i.e., structured rules) that may be used to manipulate and augment the real-world data. The exemplified system also provides a performant framework that facilitates query exploration in real-time. Performant generally refers to the capabilities of or characterized by an adequate or excellent level of performance or efficiency. Experimental studies conducted of the exemplified system and method have shown that the exemplified system (e.g., ARQuery) can provide a fluid (continuous), low-latency query experience for the end-user to perform analysis on tabular data set (e.g., captured from tabular structured visual objects in a video feed) that is significantly faster than traditional and conventional approaches (e.g., using spreadsheet).

Performing ad-hoc analytical queries over real-world data—either in paper or digital form—is challenging. With recent advances in modern computer vision, and with the pervasive availability of camera-enabled devices, the exemplified system and method use augmented reality technology to query the real world. The exemplified system is configured to translate query results into visual encodings, and then grounding them (i.e., the resulting visual output with the query results) in reality. That is, the encoding is anchored to landmarks in a captured frame and can correspondingly move with the landmark as the views and perspectives of the frame change. To this end, the user is able to "hallucinate" (i.e., visualize in an augmented reality environment) analytical query sessions as well as to find answer, filter, sort, and/or aggregate queries faster and more effectively than performing the action by hand, or through a spreadsheet-based query interface.

In an aspect, a method is disclosed of operating an augmented reality system (e.g., AR query and analytics system), the method comprising receiving, by a processor, a video stream from a video capture sensor (e.g., of paper documents, digital or printed signage, posters, physical or digital displays, real-world objects, indoor and outdoor spaces, hardware device displays, vehicle dashboards, and other real-world scenes); determining, by the processor, a plurality of structured data elements in one or more frames of the video stream; and presenting, by the processor, via a graphical user interface, a first visual output corresponding to the video stream and a second visual output having a plurality of augmented data elements associated with the determined plurality of structured data elements.

In some embodiments, the method includes receiving, by processor, via the graphical user interface, a gesture input corresponding to an augmented data element of the plurality of augmented data elements; determining, by the processor, a command based on the received gesture input; and executing, by the processor, the command.

In some embodiments, the command is selected from the group consisting of a grouping command, an exclude command, an append row command, an associate command, an append and aggregate command, and a sorting command.

In some embodiments, the step of determining the plurality of structured data elements in the frame comprises: detecting, by the processor, data elements in the one or more frames; segmenting, by the processor, the data elements from the frame; and performing, by the processor, optical character recognition operation of the segmented data elements to generate a plurality of arrayed text data.

In some embodiments, the step of detecting data elements in the one or more frames comprises: detecting at least one of parallel lines, straight lines, and co-aligned text groups in a frame of the one or more frames.

In some embodiments, the method includes (e.g., grouping by aggregation command): determining, by the processor, a first set of structured data elements (e.g., attributes) (e.g., determined headers of rows or columns) and a second set of structured data elements (e.g., data) in one or more frames of the video stream, wherein the first set of structured data elements correspond to an attribute type, and wherein the second set of structured data elements correspond to a data type; receiving, by processor, via the graphical user interface, a first gesture query input (e.g., swiping right gesture) corresponding to a first augmented data element of the plurality of augmented data elements, wherein the first augmented data element is associated with the first set of structured data elements corresponding to the attribute type; determining, by the processor, one or more structured data elements of the second set of structured data elements associated with the first augmented data element; rendering the one or more structured data elements of the second set of structured data elements as an augmented object associated with the first augmented data element; and presenting, by the processor, via the graphical user interface, the rendered augmented object of the one or more structured data elements of the second set of structured data elements.

In some embodiments, the method further includes generating, by the processor, a result of a mathematical operator (e.g., maximum operator, minimum operator, average operator) performed on values derived from the one or more structured data elements of the second set of structured data elements; and presenting, by the processor, via the graphical user interface, the result of the mathematical operator.

In some embodiments, the method further includes generating, by the processor, a second result of a second mathematical operator (e.g., maximum operator, minimum operator, average operator) performed on second set of values derived from the one or more structured data elements of a second group of structured data elements; and co-presenting, by the processor, via the graphical user interface, the second result of the second mathematical operator next to the result of the mathematical operator.

In some embodiments, the result of the mathematical operator is rendered with a first color value (e.g., red) and the second result of the second mathematical operator is rendered with a second color value (e.g., blue).

In some embodiments, the mathematical operator is selected from group consisting of a maximum operator, a minimum operator, an average (mean) operator, and a mode operator.

In some embodiments, the method further includes finding, by the processor, contours of table cells in the one or more frames; sub-selecting, by the processor, a plurality of corner elements of the table cells using an optical flow tracking operation; and updating, by the processor, rendered augmented object of the one or more structured data elements based on a grounding space derived from the optical flow tracking operation.

In some embodiments, the optical flow tracking operation is performed using the Lucas-Kanade method.

In some embodiments, the method further includes (e.g., encoding space): determining, by the processor, a first set of structured data elements (e.g., attributes) (e.g., determined headers of rows or columns) according to a data model; parameterizing, by the processor, the first set of structured data elements to a pre-defined encoding space, wherein the parameterized first set of structured data elements are presented via a pre-defined presentation model.

In some embodiments, the parameterized first set of structured data elements are presented via a pre-defined presentation model by encoding the parameterized first set of structured data elements to a pre-defined grounding space, wherein the encoding space is independent of the grounding space.

In some embodiments, the method further includes evaluating, by the processor, a plurality of interactive visual querying grammar; and executing, by the processor, an associated operator corresponding to a determined interactive visual querying grammar.

In some embodiments, the method includes detecting, by the processor, a table schema in the one or more frames of the video stream; extracting, by the processor, elements in a query space data representation of the table schema; presenting, by the processor, via the graphical user interface, the extracted elements in a corresponding presentation model; receiving, by the processor, a gesture on an element of the query space data representation of the table schema; and performing, by the processor, a query in the query space of the received gesture.

In some embodiments, the method further includes tracking, by the processor, extracted elements in the query space data representation.

In some embodiments, the second visual output having the plurality of augmented data elements are presented as augmented highlights selected from the group consisting of occlusion masks, colors, and text annotations.

In some embodiments, the processor and the video capture sensor are part of a smart phone, a tablet, or a wearable head set.

In another aspect, a system is disclosed comprising a video capture sensor; a display; a processor; and a memory having instructions stored thereon, wherein execution of the instructions cause the processor to receive a video stream from the video capture sensor; determine a plurality of structured data elements in one or more frames of the video stream; and present, via a graphical user interface, on the display, a first visual output corresponding to the video stream and a second visual output having a plurality of augmented data elements associated with the determined plurality of structured data elements.

In another aspect, a non-transitory computer readable medium is disclosed comprising having instructions stored thereon, wherein execution of the instructions by a processor of a computing system cause the processor to receive a video stream from a video capture sensor of the computing system; determine a plurality of structured data elements in one or more frames of the video stream; and present, via a graphical user interface, on a display of the computing system, a first visual output corresponding to the video stream and a second visual output having a plurality of augmented data elements associated with the determined plurality of structured data elements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Indeed, this application is directed to analytics and visualization of results of analytics operations using augmented. Certain visualizations, as presented in color, may be necessary for the understanding of the claims.

The accompanying drawings, which are incorporated in and constitute a part of this specification, illustrate embodiments and together with the description, serve to explain the principles of the methods and systems. Embodiments of the present invention may be better understood from the following detailed description when read in conjunction with the accompanying drawings. Such embodiments, which are for illustrative purposes only, depict novel and non-obvious aspects of the invention. The drawings include the following figures.

Figure 1:
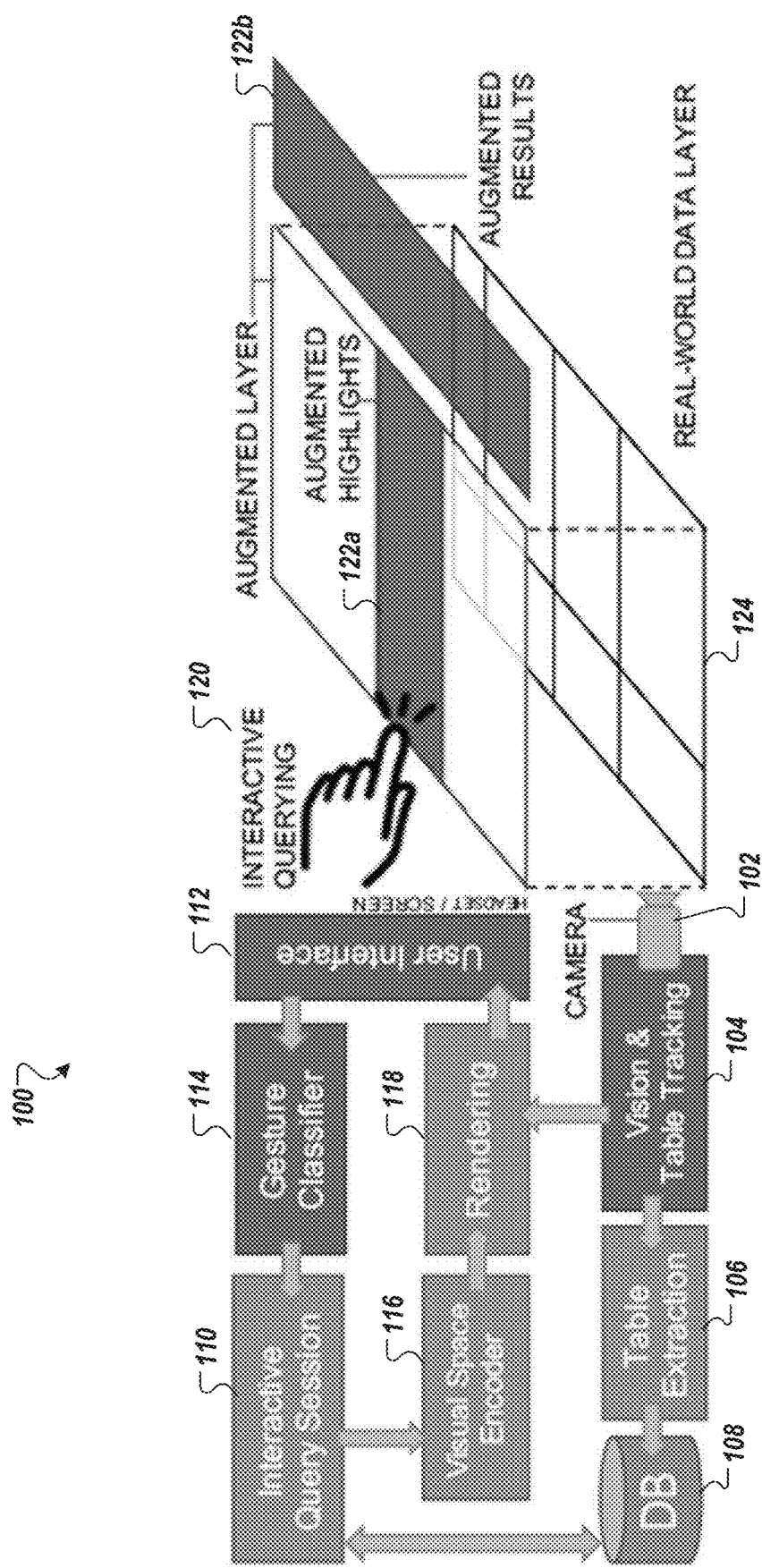

FIG. 1 is a diagram of an overall architecture and data layers of an exemplified system (e.g., augmented reality query system), in accordance with an illustrative embodiment.

Figure 2:
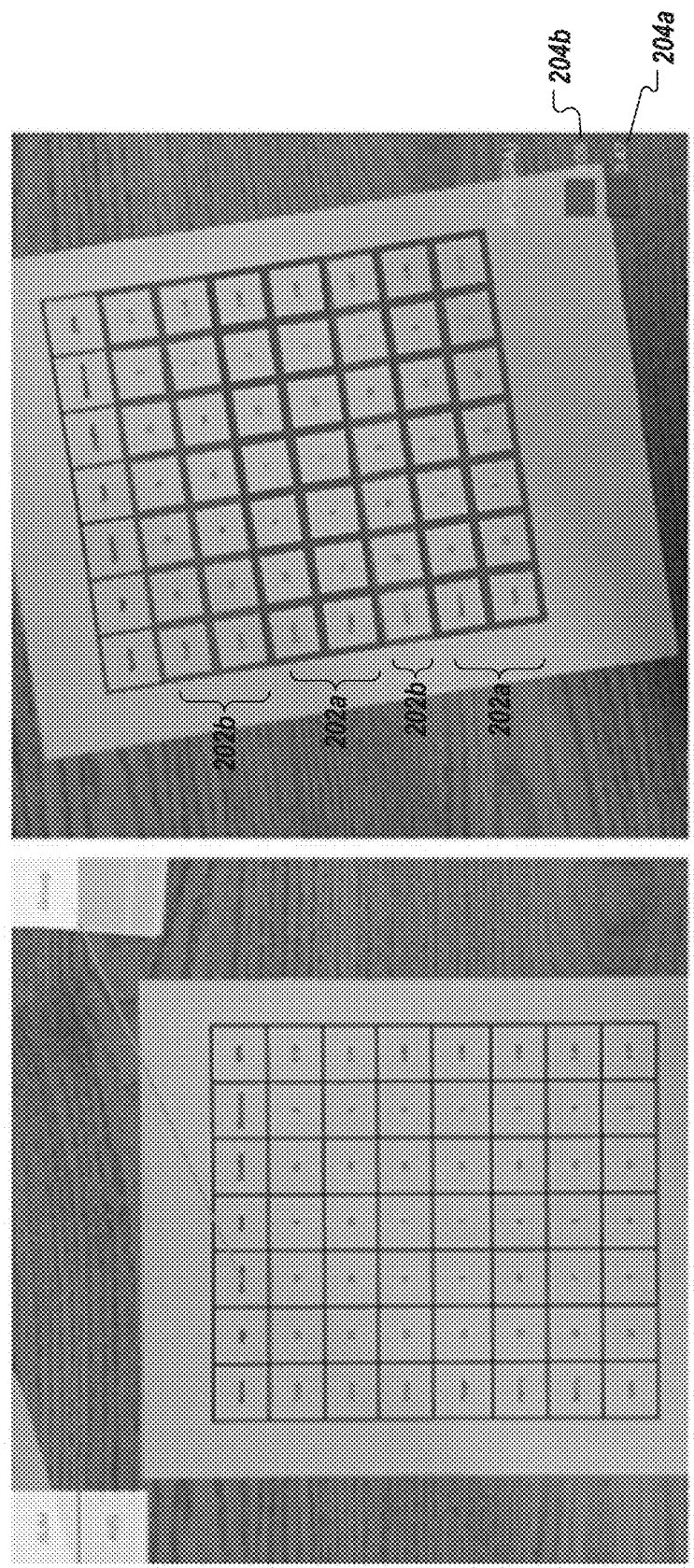

FIG. 2 shows an example operation of the exemplified system of FIG. 1, in accordance with an illustrative embodiment.

Figure 3:
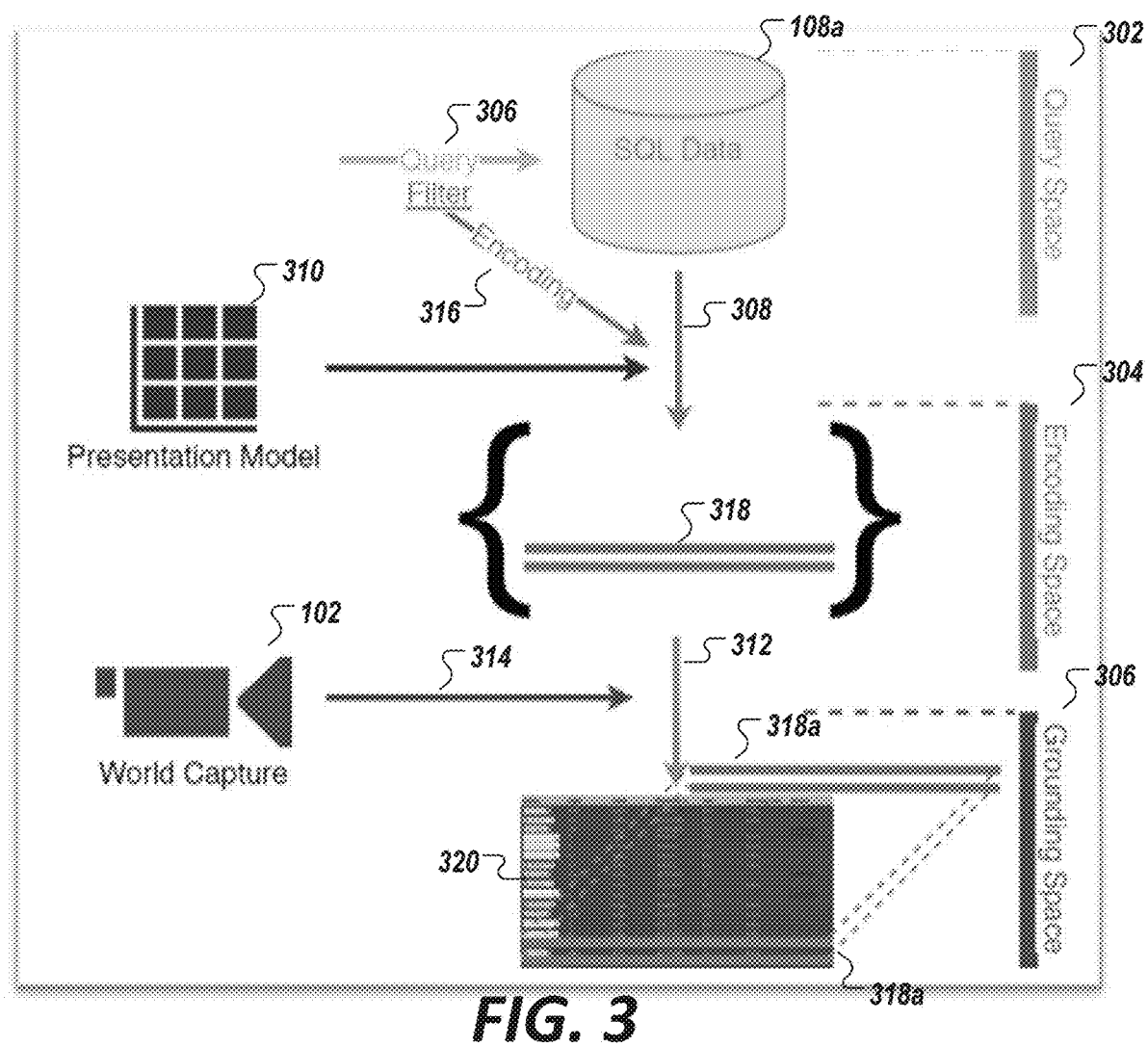

FIG. 3 is a diagram showing an overview of the data model and result spaces used by the exemplified system to visually encode result sets in an augmented reality environment, in accordance with an illustrative embodiment.

Figure 4:

FIG. 4 is a diagram showing an example user case for querying the exemplified system (e.g., of airport schedules), in accordance with an illustrative embodiment.

FIGS. 5A, 5B, 5C, and 5D each shows a diagram of results from a query operation performed by the exemplified system, in accordance with an illustrative embodiment.

FIGS. 6A-6G show examples of query gestures and corresponding operations as performed by an exemplified system, in accordance with an illustrative embodiment.

FIG. 7 is a diagram showing example results from a combined augmented highlight encoding and virtual result encoding operation, in accordance with an illustrative embodiment.

Figure 8:
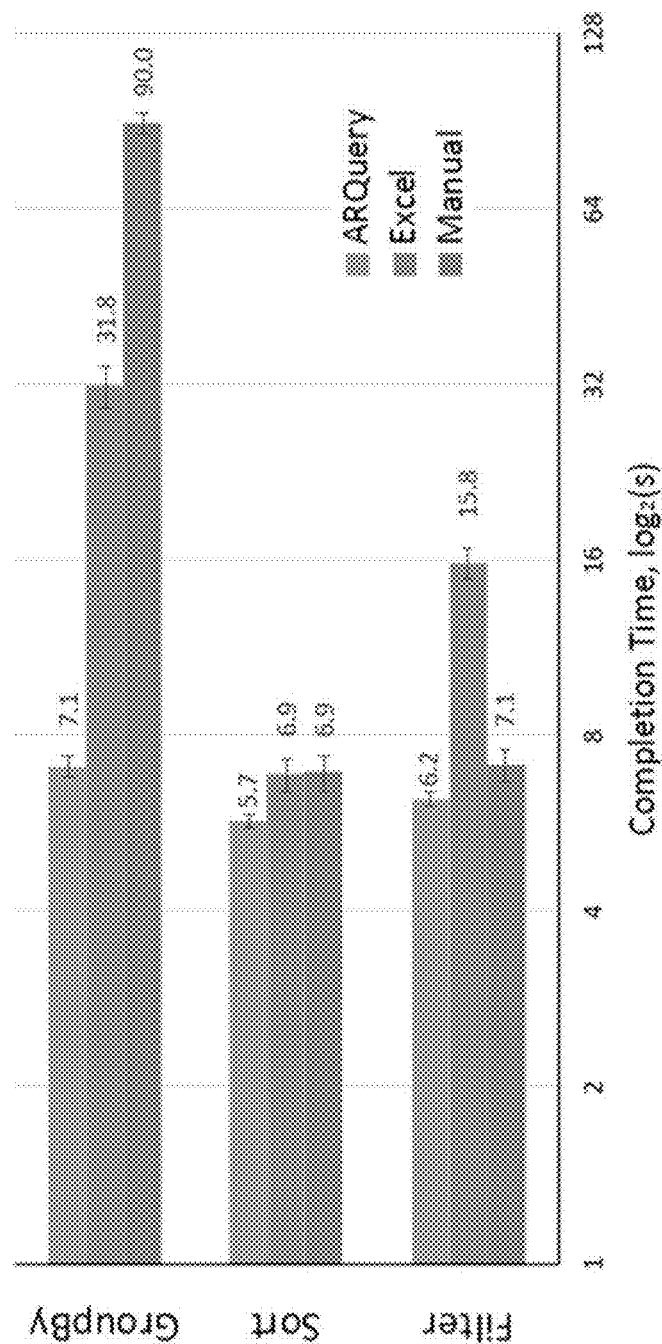

FIG. 8 is a diagram showing experimental results of the average completion type for three classes of queries performed with different methods in accordance with an illustrative embodiment.

Figure 9:
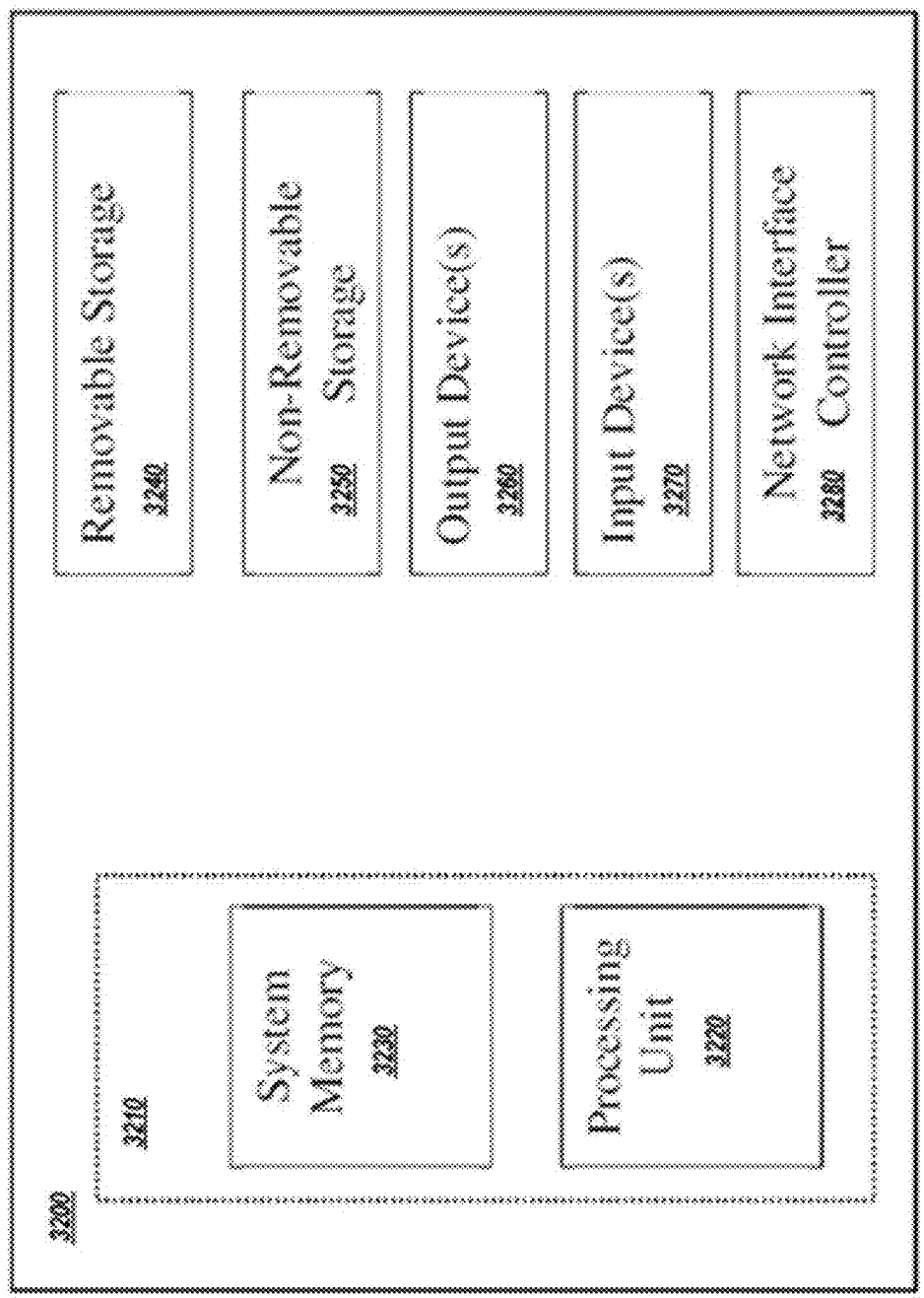

FIG. 9 is a diagram of an example computing device upon which embodiments disclosed herein may be implemented.

DETAILED DESCRIPTION

Embodiments of the present invention may be better understood from the following detailed description when read in conjunction with the accompanying drawings. Such embodiments, which are for illustrative purposes only, depict novel and non-obvious aspects of the invention.

Each and every feature described herein, and each and every combination of two or more of such features, is included within the scope of the present invention provided that the features included in such a combination are not mutually inconsistent.

Exemplified System

FIG. 1 is a diagram of an overall architecture and data layers of an exemplified system 100 (e.g., an augmented reality query system, also referred to as "ARQuery") in accordance with an illustrative embodiment.

In FIG. 1, the exemplified system 100, in some embodiments, is configured to tap into (i.e., access) the device's camera video feed (e.g., captured via camera 102). The exemplified system (e.g., 100), in some embodiments, includes a computer vision module 104 configured to process one or more frames to detect, segment, and filter tables, e.g., to extract tabular data in the video frame. The table data are then converted (e.g., via 104), in some embodiments, into textual data, e.g., via optical character operation, and extracted into a typed 2-D array, e.g., to facilitate the subsequent processing of the data. In some embodiments, the typed 2-D array data are used for ORDER BY and GROUP BY operations, among others. For extraction at the computer vision level (e.g., 104), the exemplified system 100, in some embodiments, is configured to use a table detection method, e.g., that assumes that the table is the maximally connected component in the area determined to contain a table. In some embodiments, the vision and table tracking module 104 is configured to detect parallel lines, straight lines, and/or co-aligned text groups. In some embodiments, this extraction operation is made performant by tracking objects across two or more sequential frames, e.g., to minimize the number of times the extraction pipeline (e.g., associated with 104 and 106) is invoked.

FIG. 2 shows an example operation of the exemplified system (e.g., 100) of FIG. 1, in accordance with an illustrative embodiment. In FIG. 2, an exemplified query, e.g., a "GROUP BY" aggregation operation, is shown to be performed on tabular data on a sheet of paper based on an input gesture received from a user that can be characterized as a "swiping right" motion performed on an attribute associated table element. Specifically, FIG. 2 shows a photograph of the user interface of a computing device executing the exemplified system. The resulting operation is shown to yield divergent color-coding highlights that represents a number of groups (shown as 202a and 202b). The exemplified system (e.g., 100) is further shown in FIG. 2 to aggregate the tabular elements of the respective group and present the aggregate results of each respective groups as an augmented result (shown as legend 204a and 204b).

Referring to FIG. 1, the exemplified system (e.g., 100) includes a table extraction module (e.g., shown as "table extraction 106"). In some embodiments, the table extraction module (e.g., 106) is configured to receive the transcribed 2-D array from the vision and table tracking module (e.g., 104) and perform a table extraction operation. Example of table extraction operation that may be performed, includes, but are not limited to, Deep-Dive and Fonduer. Description of Deep-Dive can be found at C. Zhang, "DeepDive: a data management system for automatic knowledge base construction," Madison, Wis.: University of Wisconsin-Madison, 2015, which is incorporated by reference herein in its entirety. Description of Fonduer can be found at S. Wu et al., "Fonduer: Knowledge base construction from richly formatted data," SIGMOD, 2018, which is incorporated by reference herein in its entirety.

Due to the nature of exemplified gestural query specification, the exemplified system (e.g., 100) may operate on the assumption that a header row exists (in a table of interest) to which the header row text and the contents of the table are then used to determine the schema of the table of interest. In some embodiments, the exemplified system (e.g., 100) is configured to further assume, or evaluate, a "row major" visual layout and use this assumption/determination to convert the typed 2-dimensional array into a SQL table (shown as "DB" 108). In SQL, tables are uniquely identified by their names and comprises columns and rows. Columns contain the column name, data type, and any other attributes for the column. Rows contain the records or data for the columns. Of course, other relational database schemas may be used.

In FIG. 1, the exemplified system (e.g., 100) is shown to further include a table tracking and rendering operation. A component of an augmented reality system may be to track the rendered augmented layer to the camera feed in real-time. The table tracking and rendering operation (e.g., performed via module 104), in some embodiments, is configured to find one or more contours of table cells and then sub-selecting all, or a substantial portion of, corner points of a given table of interest in an optical flow tracking operation. Examples of optical flow tracking operation includes, but are not limited to, Lucas-Kanade method. The Lucas-Kanade method is a differential method for optical flow estimation that assumes that the flow is essentially constant in a local neighborhood of the pixel under consideration, and solves the basic optical flow equations for all the pixels in that neighborhood, e.g., by the least squares criterion. The table tracking and rendering operation (e.g., of 104) may keep the grounding space representations up-to-date while allowing the user to continuously move the camera view, but still have the visual encoding of the current query session be correctly grounded on to the real-world data.

In FIG. 1, the exemplified system (e.g., 100) is shown to further include an interactive query session module 110. Due to the small size of the data in view, an interactive query session is maintained, in some embodiments, by the module 110 as a sequence of a configurable number of materialized views. A materialized view is a database object that may contain the results of a query. For example, it may be a local copy of data located remotely or may be a subset of the rows and/or columns of a table or join result or may be a summary using an aggregate function.

In some embodiments, each operation is performed as a CREATE MATERIALIZED VIEW $t_{i+1}$ AS SELECT . . . $Q_{i+1}(t_i)$. This may allow the user, for example, to use two fingers to swipe outside the table view, moving back and forth through the query session, as well as performing "undo" and "redo" steps, among others.

Data Model and Result Spaces

FIG. 3 is a diagram showing an overview of the data model and result spaces used by the exemplified system (e.g., 100) to visually encode result sets in an augmented reality environment, in accordance with an illustrative embodiment. In FIG. 3, the exemplified system (e.g., 100) is shown to use multiple result spaces to visually encode result sets in an augmented reality environment.

As shown in FIG. 3, the exemplified system (e.g., 100) can work on data that is present in the real-world in a tabular form. The exemplified system (e.g., 100) may use a SQL data model in its interpretation of the tabular data. In some embodiments, the exemplified system (e.g., 100) is configured to support read only queries. In other embodiments, the exemplified system (e.g., 100) is configured to support reading and writing to the real-world data set. Similar to query session operations as described in M. Khan, L. Xu, A. Nandi, and J. M. Hellerstein, "Data tweening: incremental visualization of data transforms," VLDB, 2017, which is incorporated by reference herein in its entirety, the exemplified system (e.g., 100) may model a query session as a series of operations that successively modify the result set. In some embodiments, the various result set are independently modified and aggregated.

As also shown in FIG. 3, the space of queries (shown as "query space" 302) covered the exemplified system (e.g., 100) may be defined by a set of candidate query operations (shown as 306). In FIG. 3, the queries 306 are performed on a SQL data set 108 (shown as 108*a*). As discussed above, other relational databases or the like may be employed. In some embodiments, all possible combination of query operations are evaluated, including, for example, but not limited to: selection, projection, group, aggregate and order operations.

In addition to selection, projection, group, aggregate and order operations, in some embodiments, binary relation operators such as union and join operations are supported directly in the system. That is, the exemplified system includes, in such embodiments, native union and join operators and performed them on the data. In other embodiments, binary relation operators such as union and join are approximated, e.g., by performing concatenation or juxtaposition operations on multiple real-world tables. The exemplified system (e.g., 100), in some embodiments, is configured to further perform join encoding operations in an augmented reality environment using a visual querying grammar. Further description of an example join encoding operation is provided below.

Referring still to FIG. 3, the query model does not by itself provide a means to visually represent query results (shown as 308) to the user in an augmented reality environment. To facilitate this feature, the exemplified system (e.g., 100) may employ at least two additional spaces: an encoding space (shown as 304) and a grounding space (shown as 306). These spaces (e.g., 304, 306) may provide the visual representations of result sets generated from the query space (e.g., 302). To this end, the query space 302 may only include the underlying data model (e.g., relational data model) independent of the visualization space. In combination, these spaces (e.g., 302, 304, 306) may be used by the exemplified system (e.g., 100) to convey query results (e.g., 308) to the user in a real time augmented reality environment.

The encoding space 302 uses, in some embodiments, a presentation model (shown as 310) obtained, or derived, from the real world and queries on the underlying data to produce visual artifacts that are then used to encode the result sets. Examples of presentation model may include, but are not limited to, layout information, color highlights and shading, text fonts and rendering, lighting, among others. Results (shown as 312) from the encoding space 302 are transformed onto the real world (shown as a video feed 314 from a camera 102) in the grounding space 304. These grounded visual artifacts generated in this space may serve as the final result set representation in the exemplified system (e.g., 100). Further description of the encoding and grounding spaces, the benefits for them, and their interactions are further described below.

As an example of operability among the various result spaces, in FIG. 3, the exemplified system (e.g., 100) is shown to perform a filter operation 316 corresponding to a query on a data set 108*a*. A filter encoding operation 316 is then shown performed using a presentation model (e.g., 310), e.g., having pre-defined tabular elements, on the data set 108*a* to provide an encoded result 318 in the encoding space 304. Here, the encoded result 318 is a pair of template highlighting having spatial ratios that corresponds to the length and height of row elements in a table of interest. The encoded highlighting result 318 (shown as 318*a*) is then combined with frame data (e.g., 314) in the grounded space 306 to produce the resulting augmented reality visualization (shown as 320). In the visualization 320, the encoded highlighting (e.g., 318) is shown overlaid over an acquired frame data.

The Encoding Space

As noted above, the exemplified system (e.g., 100) addresses challenges associated with mixed reality environments, in some embodiments, using an encoding space. A challenge associated with mixed reality environment is the presence of the tangible real-world objects, which unlike completely virtual environments, are difficult to erase in an augmented reality environment. A sorting operation of table elements in a table in the real-world traditionally entails rearranging all cells of the table according to sorting rules. However, rearranging of visual artifacts may involve erasure or masking operations which may not be practical to do. Rather, the exemplified system (e.g., 100) is configured, in some embodiments, to utilize color (as an additive element) to encode positions and/or rank. Indeed, the exemplified system (e.g., 100) may encode any changes to a result set in an additive manner to the original real-world data (e.g., table data). Because additive encodings may be limited or not possible in a relational space (e.g., as discussed in relation to the above sorting example), the exemplified system (e.g., 100), in some embodiments, may use an encoding space (e.g., 304) for appropriate representations.

The encoding space (e.g., 304), in some embodiments, is parameterized by a mapping from a data model (e.g., 108*a*) to a presentation model (e.g., 310) and to one or more corresponding encoding functions (e.g., 316). The presentation model 310 (e.g., used for encoding onto a real-world table), in some embodiments, is defined by one or more components that make up a table and their relative positions, e.g., in a two-dimensional coordinate system and, e.g., defined by a bounding box of the table. Of course, three-dimensional coordinate system may also be used. In some embodiments, the one or more components of the table that may be referenced include individual cells, rows, columns, and headers of columns. The components, in some embodiments, are stored in a 2-D array that is oriented, or is in the same configuration, as the query session table (which is in grounded in reality). The matching configuration of the 2-D array with the underlying real-world data allows for easy access of the real-world data by the 2-D array data.

The encoding functions, in some embodiments, are configured to produce a set of preliminary or intermediate visual artifacts of the encoded result. The exemplified system (e.g., 100) may use a presentation model's relative coordinate system (having positioning information) to generate the visual artifacts. Example of presentation model's relative coordinate system may also include dimensions, and/or positions, among other parameters.

For example, the exemplified system (e.g., 100) may encode "order-by" attributes with the height of a 3-D histogram bar being placed on top of table rows as provided from a presentation model of the histogram bar. The resulting 3-D histogram-bar object(s) as generated by in the encoding space (e.g., 304) are then anchored in the real world in the grounding space (e.g., 306). Indeed, even though the histogram object(s) may be placed near the table in a 2-D coordinate system, the objects and its corresponding visualization may go outside the parameterized specification of the presentation model, e.g., in the third dimension. The ability to define new or updated encodings without having to redefine the data model is a benefit that further improve utility of the encoding space (e.g., 304).

In addition, new encodings can be, for example, added or swapped in a modular fashion by changing the encoding functions associated with a certain query operation.

In some embodiments, in the exemplified system (e.g., 100), a set of encoding functions and their corresponding parameters may be generated for each query session operation. Indeed, more than one encoding spaces may be used (e.g., for a single query session or multiple query sessions). The results may then be rendered into the encoding space (e.g., 304), and then grounded into reality in the grounding space (e.g., 306). The encoding functions may be adjusted or modified by visual querying grammar, which is further discussed below.

The Grounding Space

As discuss above, the encoding space provides visual representations (e.g., static or dynamic visual representations) of the result set but is in not anchored in reality. That is, the visual representations and artifacts of the encoding space are not tied to the real-world visualization (e.g., to the video frames). Dynamic visual representation may include, but are not limited to, flashing, varying colorization, and the like.

The exemplified system (e.g., 100) is configured to use the grounding space to takes visual artifact(s) and anchor them in accordance with a dynamic coordinate system. In the exemplified system (e.g., 100), the query session table is tracked through the camera feed, meaning that the locations of table components are changing as the components move in the camera. The grounding space thus defines the anchoring for the visual encodings from the encoding space onto the moving table components. Because the visual encodings from the encoding space are produced according to a mapping to a presentation model, the grounding space has, in some embodiments, an anchor for each component of the presentation model, e.g., in order to define a complete mapping from visual artifacts to locations in the grounding space.

While the exemplified system (e.g., 100) uses, in some embodiments, visual tracking to anchor encodings in the camera feed, other mapping to anchors could be used. In some embodiments, a world tracking module is employed, and encodings could be anchored on to the world space for persistence even when the table is not within the camera feed. The modularity of the grounding space definition allows for a wide range of such mappings.

Interaction Model

As described in the above data model section, the exemplified system (e.g., 100) may perform operations that models, in some embodiments, query sessions as a series of operations that successively modify the result set. Example of operations may include, but are not limited to, selection, projection, group by/aggregate, and ordering. Each operation may have corresponding parameters and one or more encoding functions associated with it. Following an operation, the results are visually encoded and anchored in the augmented reality environment until another operation occurs, changing the result set and its encoding.

Gestural Query Specification.

The query session operations described herein are triggered by gestures on an encoded result set in the augmented reality environment. The exemplified system (e.g., 100) adopts, in some embodiments, a gestural query specification. In some embodiments, the gestural query may be based on GestureDB operation to define the mapping from gestures to result set operations, for example, as described in A. Nandi, "Querying Without Keyboards," CIDR, 2013, which is incorporated by reference herein in its entirety.

Mapping Gestures in AR to the Query Space.

To map from gestures that occur in an augmented reality environment to operations in the query space, the exemplified system (e.g., 100), in some embodiments, is configured to map from the grounding space to the query space. As discussed above, when creating visual encodings from operations on the underlying data, the exemplified system (e.g., 100) may map from the query space (e.g., 302) to the encoding space (e.g., 304) to the grounding space (e.g., 306). Indeed, wen obtaining operations from gestures, the exemplified system (e.g., 100) performs similar or same operations, but in the reverse sequence.

In some embodiments, a gesture G may first occur in an augmented reality environment. The gesture G may involve a sequence of key points K in the grounding space's target coordinate system. The key points K are then mapped to a sequence P that are evaluated to determine whether they correspond to the presentation model components that occupy the points defined in K. Then, using the inverse data model to presentation model mapping, sequence P is mapped to a query space operation parameters $p_o$ for an operation that is determined using rules of the form (G, $p_o$)=>o, where o is a query session operation. The antecedent (G, $p_o$) corresponds, in some embodiments, with a gesture in the gestural query specification.

This process allows the exemplified system (e.g., 100) to effectively obtain query session operations from gestures in the augmented reality environment and defines a model for interacting with structured data in the augmented reality environment using gestures.

Referring back to FIG. 1, a gesture is shown to be received from a user interface 112, e.g., a touch-screen display. The exemplified system (e.g., 100) includes a gesture classifier module 114 (shown as "gesture classifier" 114) that, in some embodiments, executes the gestural query specification, e.g., as discussed above. The output of the gesture classifier module 114, in some embodiments, is then provided to the interactive query session module 110.

The exemplified system (e.g., 100) may also include a visual space encoder 116 that takes the output of the interactive query session module (e.g., 110) to perform the encoding functions (e.g., in the encoding space). Following the encoding function operation, the visual space encoder 116 then outputs the result to a rendering module (e.g., shown as 118) that combines the encoded result artifacts with frame data captured by the vision and table tracking module 104.

To this end, a gesture 120 received and/or detected at the user interface 112 can be operated upon as an interactive query to which encoded visual artifacts 122 (shown as 122a and 122b) corresponding to operations of interest are generated (e.g., from parsed table elements derived from the camera frame) and then rendered and anchored to the input camera frame 124.

A Visual Querying Grammar for Augmented Reality

The system may use a constructed interactive visual querying grammar (e.g., structured rules). From a query experience standpoint, a user is presented with an interface in which the user may view a table presented on the system's video feed. The exemplified system (e.g., 100) may detect the table and extracts the query space data representation of the table schema, along with the corresponding presentation model. Following the extraction, the exemplified system may then track the table (e.g., at the cell level), which is maintained in the grounding space. As the table is being tracked, the user can perform a gesture on the table in the video feed in order to carry out a query. The exemplified system may then execute a query in the query space, the result of which is stored as a materialized view. Using the query operation, the result set, and the presentation model, the exemplified system may then derive the visual encoding for the results using encoding functions. Once the visual encoding has been anchored in the grounding space, the exemplified system may render results in to reality (e.g., in the same live camera feed).

FIGS. 5A, 5B, 5C, and 5D each shows a diagram of results from a query operation (e.g., 306) performed by the exemplified system (e.g., 100), in accordance with an illustrative embodiment.

FIG. 5A shows table data, e.g., captured via a camera feed.

FIG. 5B shows the same data of FIG. 5A following a query operation by the exemplified system to filter all rows that contain a value. Here, the value is highlighted according to an order operation that sorted the data by price.

FIG. 5C shows the same data of FIG. 5A following another query operation by the exemplified system to select a product name from the list of products where the price has a value less than 15.

FIG. 5D shows the same data of FIG. 5A following yet another query operation by the exemplified system to select a product name from the list of products where the products are grouped by a supplier identifier value. The figure further shows annotations associated with mathematical function performed on the selected data elements.

FIGS. 6A-6G show examples of query gestures and corresponding operations as performed by an exemplified system, in accordance with an illustrative embodiment.

In some embodiments, the query gesture of tapping and holding a value in a given cell of the table may direct a filter operation to identify all rows that contain that value. In some embodiments, the gesture may direct a filter operation that exclude non-selected values, e.g., using a visual mask. In some embodiments, the query gesture of tapping and holding a cell corresponding to a column header may direct a filter operation that excludes the column (projection). In some embodiments, the query gesture of swiping up or down on a cell corresponding to a column header may direct a filter operation to sort the column by overlaying sequential color gradient. In some embodiments, the query gesture of swiping right on a cell corresponding to a column header may direct a filter operation that aggregates the values in the selected columns to produce a divergent color annotation and a virtual result plane.

Figure 6A:
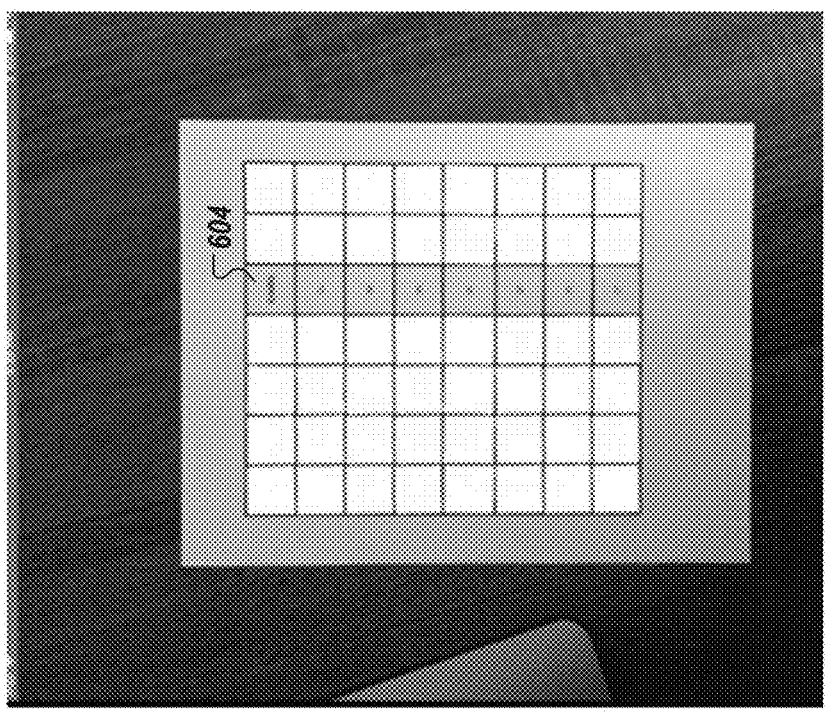
Figure 6A:
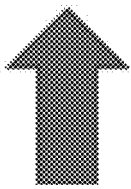
Figure 6A:
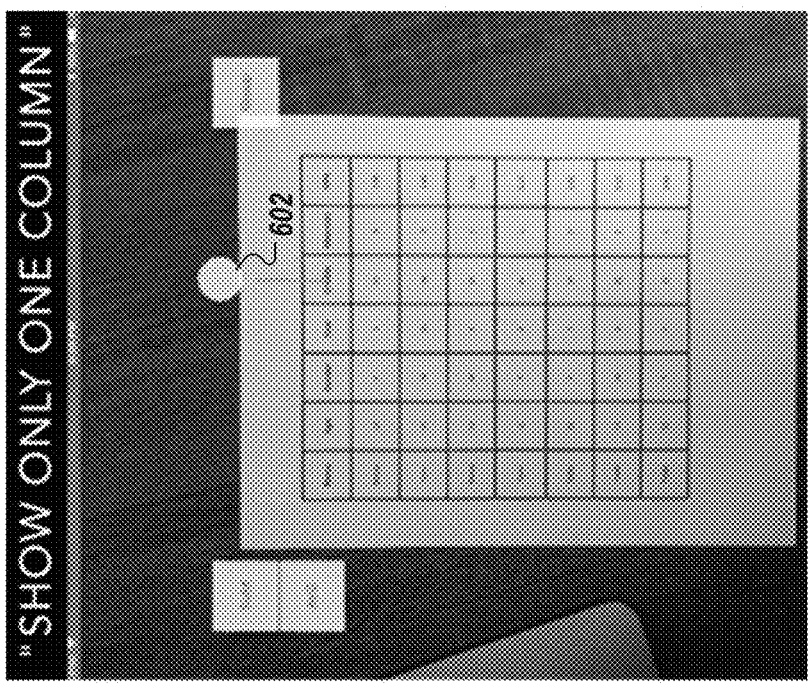

In FIG. 6A, it is shown that a column select operation as performed from a query gesture comprising a tapping and holding gesture detected at a header position (shown as 602) of a table produces a column selection operation (604).

Figure 6B:
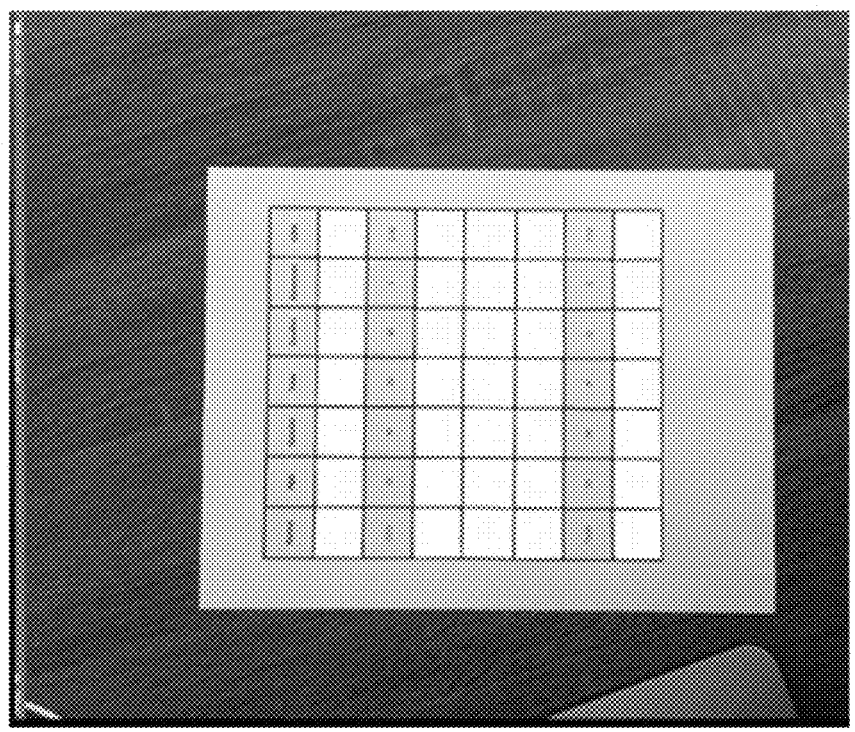

In FIG. 6B, it is shown that a row select operation as performed from a query gesture comprising a tapping and holding gesture detected at a column header position of a table produces a row selection operation. In FIG. 6B, it is also shown that multiple rows may be selected.

Figure 6C:
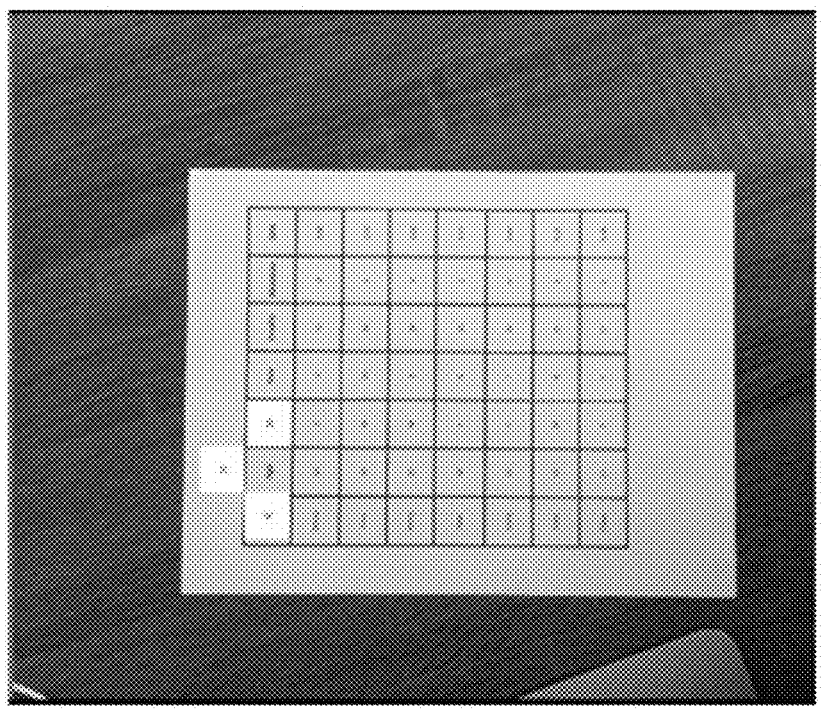
Figure 6C:
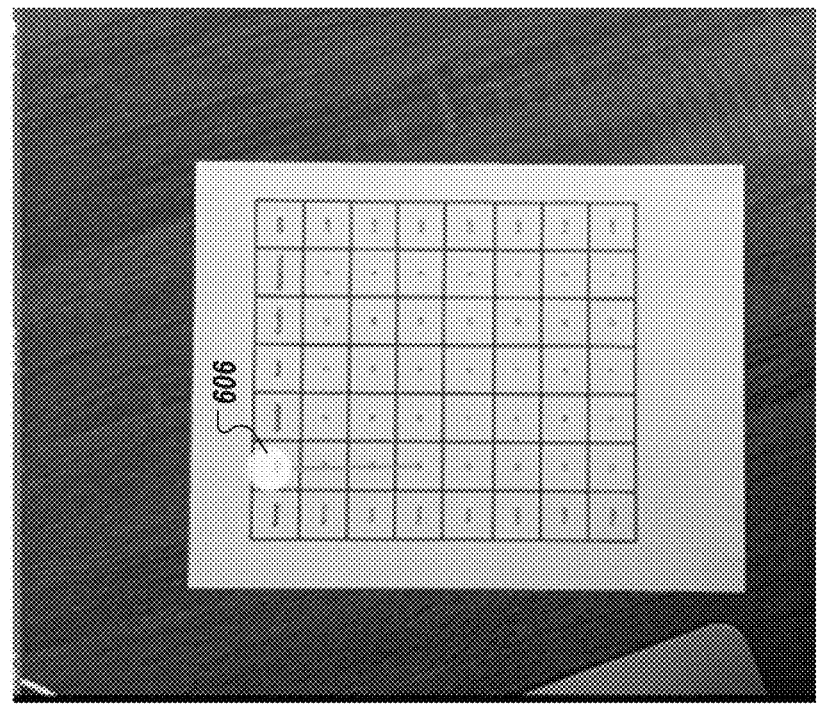

In FIG. 6C, it is shown that a column select operation may be used in conjunction with a mathematical operation (and aggregate operation). Once a tapping and holding gesture (e.g., shown as 606) is detected at a header position, the exemplified system (e.g., 100) presents a set of candidate and/or available operators to perform on the selection. In FIG. 6, an "equal" operator, "less than" operators, and "greater than" operator is shown.

Figure 6D:
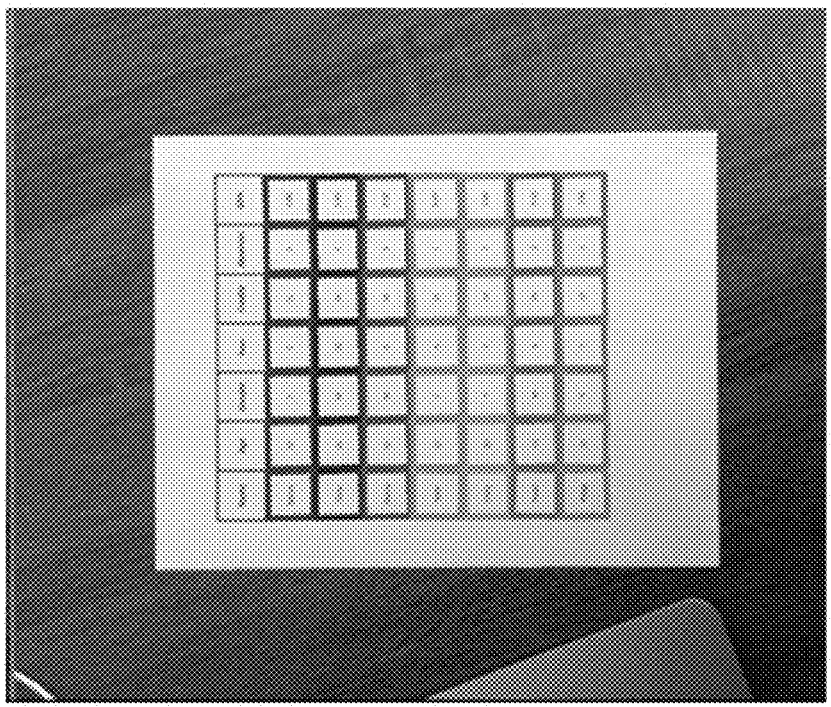
Figure 6D:
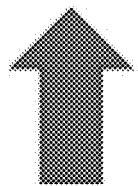
Figure 6D:
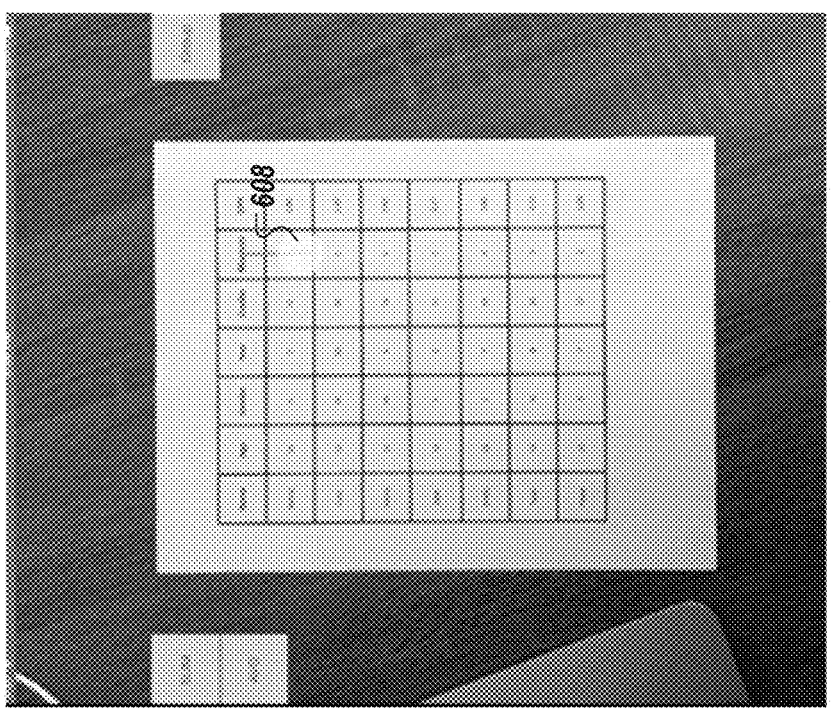

In FIG. 6D, a sorting operation is shown. Specifically, in FIG. 6D, a wiping gesture (shown as 608) detected along a column. The results is an analysis that produces color annotations of the row elements of that column sorted by color intensity.

Figure 6E:
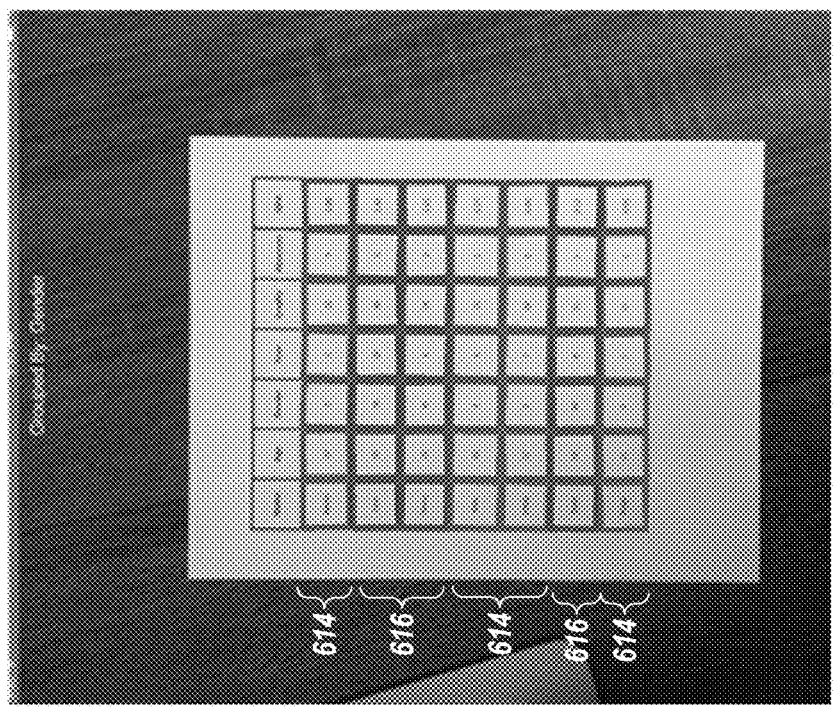
Figure 6E:
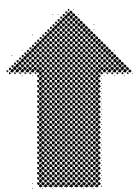
Figure 6E:
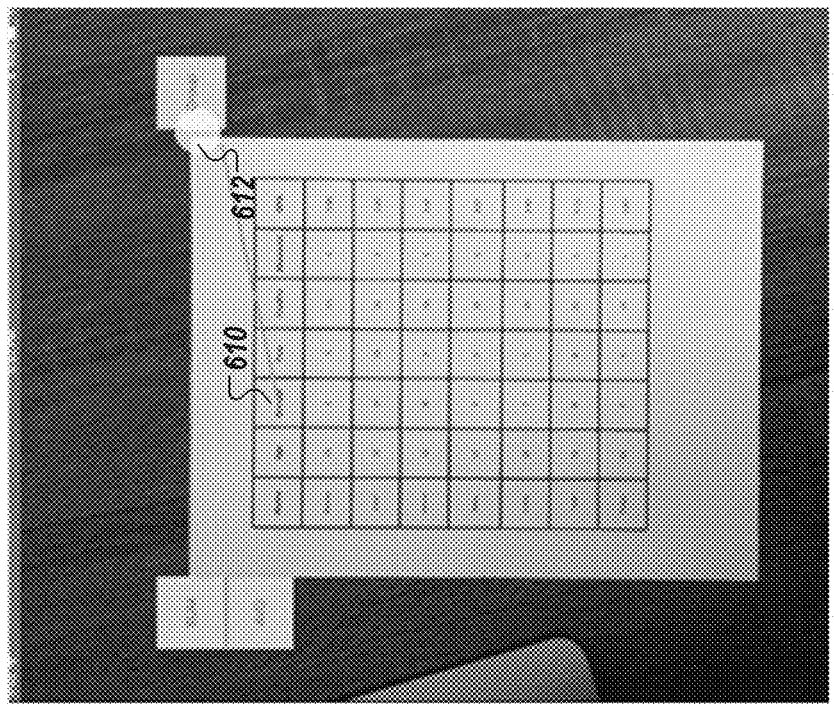
Figure 6F:
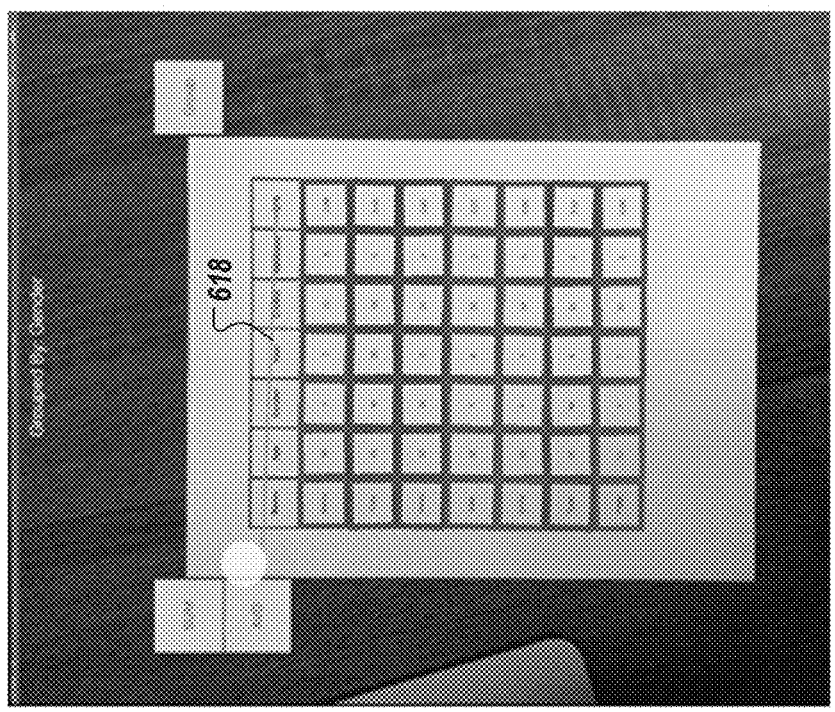
Figure 6G:
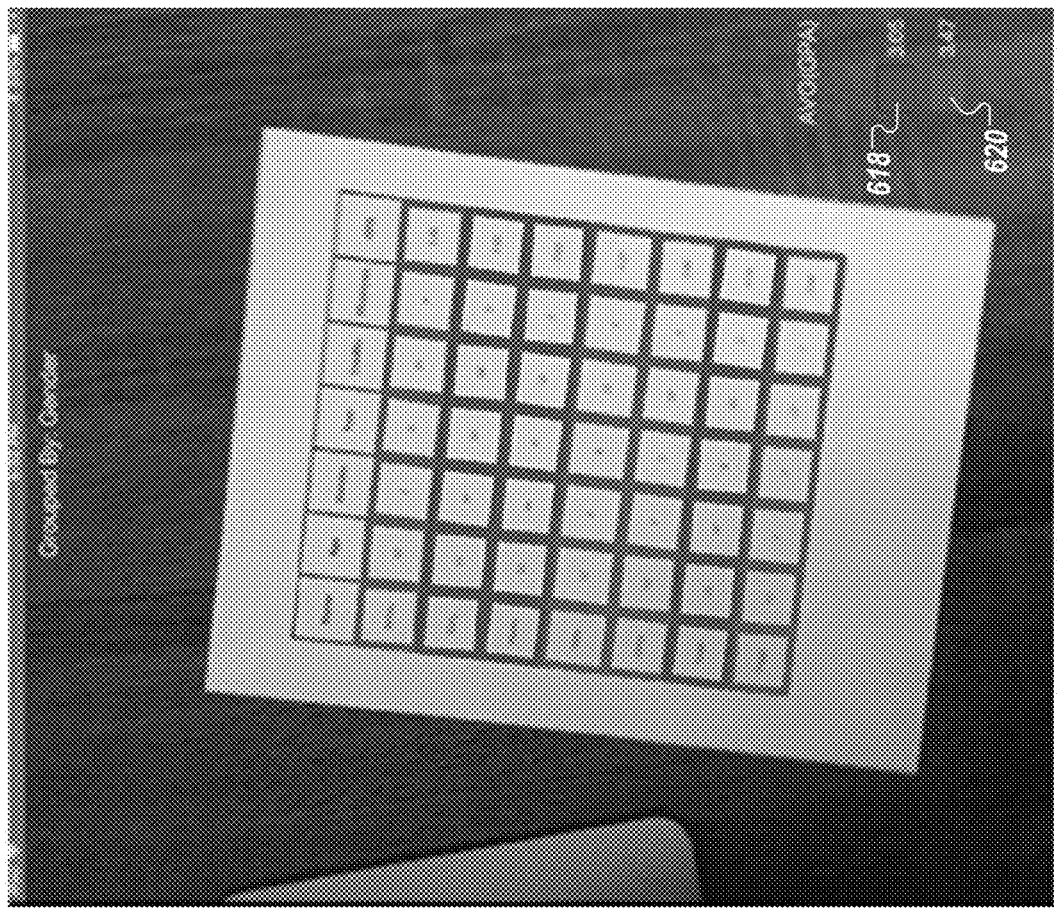

In FIGS. 6E-6G, a set of operations is performed to select a group of table elements and to aggregate the results. In FIG. 6E, a grouping operation is first shown. Specifically, in FIG. 6E, upon a gesture (shown as 610) being detected starting from a row header of a table and ending at a group button (612), the exemplified system (e.g., 100) provides an input (612) to perform a grouping operation. Here, the grouping operation is selected, and two groups are identified (shown as 614 and 616).

FIG. 6F shows a subsequent gesture (shown as 618) (to FIG. 6E) that initiates at a column and terminating at an averaging operator. The gesture 618 directs the exemplified system (e.g., 100) to aggregates the table elements of each given group (e.g., 614 and 616) and generate a visual output (shown in FIG. 6G) of an aggregate average value for each corresponding group (shown as 618 and 620, respectively). FIG. 6G also shows the anchoring aspect of the exemplified system.

Visual Encoding for Real-World Data: Augmented Highlights and Virtual Results

As described above, mixed reality environments impose constraints that are not present in virtual environments and may require that result set encodings are additive. To do this, in some embodiments, the exemplified system (e.g., 100) is configured to employ two or more classes of additive visual encoding elements, including, for example, but not limited to, augmented highlight encoding and virtual result encoding, e.g., as shown in FIG. 1. The exemplified system (e.g., 100) may maintain a strict connection between the visual encoding to individual cells in the original table's presentation model in order for the visual encoding to be tracked and rendered correctly over the underlying table in real-time.

Augmented highlight encoding may utilize visual cues (e.g., occlusion masks, colors, text annotations) to encode information. Indeed, the augmented highlight encode may use existing data elements in a real-world data table to modify the meaning of these elements. Virtual-results encoding on the other hand are "synthetic" visual artifacts that do not fit the shape or schema of the real-world data table.

FIG. 7 is a diagram showing example results from a combined augmented highlight encoding and virtual result encoding operation, in accordance with an illustrative embodiment. As shown in FIG. 7, the augmented highlight encoding produces visual artifacts in the form of color visualizations that are overlaid over the underlying data in the first 4 columns (shown as 702) and a visual mask (704) overlaid over the last 3 rows. Further, in FIG. 7, the exemplified system (e.g., 100) also produces virtual results as a separate visual artifact that is presented as an additional column (706) to the original data and is shown in the last column. In this example, the queries (e.g., GROUP BY, HAVING, and ORDER BY queries) are represented in the encoding using augmented highlights and virtual results.

Indeed, the first four columns (orange/red) and the last 3 rows (masked grey) are augmented highlight encoded, representing grouping and filtering, respectively. The last column (AVG(Price)) is a virtual result, which does not exist in the real-world table, and "floats" as a virtual element next to the augmented highlights. In some embodiments, virtual results are highlighted, as depicted with the green ORDER BY gradient coloring.

Encoding Functions

The encoding functions (e.g., as performed by the space encoder module 116) produce the visual encoding elements in the coordinate space defined by a presentation model (e.g., as described in relation to FIG. 3). Each of the encoding functions is associated with a set of query session operations. The exemplified system (e.g., 100) uses the associated encoding operations along with the result set from the query space (e.g., as generated from the interactive query session module 110) to produce the visual encoding. Example of encoding functions of the exemplified system 100 (e.g., ARQuery system) are described in Table 1. While these functions may work well in certain applications, different sets of encoding function may be used to satisfy differing requirements and produce another encoding.

TABLE 1

| Encoding Function | Description |
| --- | --- |
| exclude(rowIndex, columnIndex) | The exclude encoding function may be used to exclude attributes, tuples, or individual cells from the table. For example, the function can be used to exclude tuples for filtering, exclude attributes for projection, or to exclude individual cells within a tuple to denote a null value. When excluding a full row, only the rowIndex can be provided. Excluding a full column may be done similarly with columnIndex. Exclusion of a table component may be represented visually with a white occlusion over the component. |
| group(rows) | The group encoding function may be used to group specified rows within the relation defined by the query session table. In some embodiments, the group of a row is a one-to-one relationship, so a row cannot be grouped twice. Visually, grouping may be done through the use of distinct color hues. |
| appendRow(tuple) | The append-row encoding function may be used to append tuple as a row to the table. In some embodiments, the tuple parameter must fit into the schema of the table it is being appended to. Appended rows are visually encoded, in some embodiments, using synthetic rows that are drawn on the bottom edge of the table, and thus they are virtual results. |
| associate(groupValues, valueType) | The associate encoding function may be used to associate a value with each group through the groupValues parameter, which maps from each group to a value. The valueType parameter provides the input values that are being associated with groups (e.g., values to be associated with an average function, AVG(Value)). The association encoding function may also be used to encode aggregate results. Legends (i.e., artifacts placed at pre-defined regions of the user interface, e.g., usually in a pre-defined corner, top, left, right, or bottom sections) may be used to visually encode the values that are associated with a group. Each given group may be assigned a color to be identified by that color and the associated value may be displayed next to the color. The valueType descriptor may be used as a legend header to give context to legend values. FIGS. 2, 5D, and 6G, for example, each shows an example legend for associating AVG(Price) values. |
| appendAggregate(groupValues, valueType) | The append-and-aggregate encoding function may be characterized as a special use case of an appendColumn function, and may be defined for convenience in representing aggregate results. The function Appends groupValues to the table in a column defined by the attribute valueType. For each row in the table, its value for the valueType attribute is determined by its group and its associated value in the groupValues mapping. By appending a column for aggregate |

TABLE 1-continued

| Encoding Function | Description |
|---|---|
| | results, the system can perform the equivalent of a HAVING query by filtering on the appended column. Sorting by the aggregate results can also be done by utilizing as appended column, for example, as demonstrated in FIG. 7. |
| order(column) | The order encoding function may be defined for three cases. In the definition used, the term synthetic is used to describe when the type of column is a virtual result (a column that was added to the end of the table). If the query session table is not grouped then all rows in the table are ordered globally. When the table is grouped and column does not represent an aggregate value, the rows in the table are ordered within their respective groups according to attribute defined by column. When the column is synthetized and represents an aggregate value, the rows may be ordered within the table globally according to the attribute defined by column. Synthetic rows, in some embodiments, are used to represent aggregate results for separate groups so by ordering globally the system allows for ordering based on aggregate results. Visually, ordering may be represented using the notion of color value from the HSV color model. |

Encoding Joins

In some embodiments, the exemplified system (e.g., 100) is configured to utilize the defined grammars to define a visual encoding for a "join" query. In the "join" query, the exemplified system is configured to operate on the table for a given query session and join that table with another relational table to produce a new result set.

In keeping with the additivity in augmented reality constraint the exemplified system defined previously, the exemplified system (e.g., 100) may construct all join results as a left outer join: $R_q \bowtie R_j$, where $R_q$ is the current query session's table and $R_j$ is the table being joined with. This operation produces a result set that contains all matching tuples without excluding tuples from the left operand of the join, which is the query session table in our case. Thus, left outer joins are inherently additive on the query session table, and fit naturally into the system's additive visual encoding. In some embodiments, the exemplified system (e.g., 100) is configured to encode other joins (inner joins, right outer joins, etc.) in combination or as an alternative to the left outer joins. In some embodiments, the type of joins is user selectable.

Consider the result $R_r = R_q \bowtie_{a\theta b} R_j$, where $a \in \text{Attributes}(R_q)$, $b \in \text{Attributes}(R_j)$, and $a\theta b$ is the join predicate. For any tuple, $t_r \in t_q$, as define per Equation 1.

$$\text{matches}(t_q, x, y, \theta) = \{t_r \in R_r : x(t_q) \theta y(t_r)\} \quad \text{(Equation 1)}$$

which is the set of matches for a tuple $t_q$ in the query session table using the join predicate $x\theta y$. Additionally, as define per Equation 2.

$$\text{leftTuplesWithSameAttribute}(t_q, x) = \sigma_{x=x(t_q)}(R_q) \quad \text{(Equation 2)}$$

which is the set of tuples in the query session table with the same value for attribute x as the tuple $t_q$. To derive a visual encoding for joins, the exemplified system (e.g., 100), in some embodiments, was implemented by considering three important cases for matches($t_q$, x, y, θ).

For some join between $R_q$ and $R_j$, the exemplified system (e.g., 100) may consider a tuple $t_q \in R_q$ and a join predicate $x\theta y$. Let m be the result of Equation 1 with parameters $t_q$, x, y, and theta. Then let l be the result of Equation 2 with parameters $t_q$ and x.

Case: $0 < |m| < |l|$. In this case, the exemplified system (e.g., 100) can associate every tuple in l from the query session table with a tuple from the result of the join under the predicate $x\theta y$, with no leftovers. By using the appendColumn encoding function for each attribute gained in the join that was not originally in the query session table, the exemplified system (e.g., 100) can capture all the information in m. Observe that this case can be used to encode joins with the following data relationships, including 1-to-1 and many-to-1.

Case: $|m|=0$. In this case, there may not be a matching tuple for $t_q$ in the result of the join under the predicate $x\theta y$. When left outer join is used, the system may encode this lack of a match as a null value. In order to encode the null values that result from this join, the exemplified system may use the exclude encoding function on cells in the columns used to append for the join for each tuple that cannot be associated with a match. Using this case in combination with the first, the system can encode joins with 1-to-0 or 1-to-1 relationships, and many-to-0 or many-to-1 relationships.

Case: $|m|>|l|$. In this case, the exemplified system (e.g., 100) can associate every tuple in l from the query session table with a different tuple from the result of the join under the predicate $x\theta y$, but there are leftover matching tuples from the join result. The exemplified system (e.g., 100) can handle the tuples that can be associated with a matching tuple (the tuples that aren't leftover) the same way the system did in the first case. To encode the additional matches, the exemplified system can use the appendRow encoding function with these tuples, which have attributes contained in $R_q \cup R_j$. Observe that this case can enable the encoding of 1-to-many relationships, and when combined with the second and rst approach we can encode 1-to-many to 0-to-many relationships as well.

Considering these three cases for every tuple in a query session table, the exemplified system (e.g., 100) can define an encoding for left outer θ-joins. Additionally, vlookup queries can be encoded, and the exemplified system (e.g., 100) can model them as a left outer join composed with a filter and a projection, producing one value. The value may be added as a virtual result over top of the cell that the vlookup query was predicated on.

Join Specification: The exemplified system (e.g., 100) may consider the problem of join specification as a separate problem, which is domain specific. For joining a query session table with a table that is within close proximity to it in the grounding space, the query model for GestureDB could be adapted, e.g., allowing for gesture based join specification. If, however, a join of the query session table with a table in a back-end data store is desired, another form of specification may be required. This may require a method for specifying which table the user/system would like to join with in the data store, and a method for specifying the predicate to join the tables with.

Experimental Results

Experimental Setup:

To evaluate the exemplified system, a study was conducted to compared it against two typical methods of analyzing real-world tabular data: using Microsoft Excel, and performing the analysis manually (i.e., by hand, without any digital tools). The study used Microsoft Excel since it is the most popular querying interface that supports filter, sort, and group operations (grouping performed using pivot), and is the typical tool to use in ad-hoc settings. For these operations, database frontends typically use interface paradigms similar to Excel (or directly connect to Excel), hence making Excel a good reference for evaluation. A within-subjects design was employed for this experiment, which is appropriate as the three methods that were being compared are distinguishable and carryover effects should be minimal.

The studies were conducted with 15 users with median age of 23, 8 of whom were females and 7 were males: a sample size consistent with prior efforts in evaluating interactive data systems. The study used an iOS implementation of the exemplified system (referred to in the study as the ARQuery system) for user studies on an Apple iPad Pro 10.5" device. The study used a synthetic table of data with seven columns and seven rows (plus an additional attributes header row) for testing. To stay consistent amongst users, each user was given the same tutorial for each tool that was used in testing (Excel and ARQuery). In addition, each user was given a chance to get familiar using these tools before the study. The study considered biases and confounding factors that are common when evaluating interactive data systems: learning, interference and fatigue. By altering the order in which each system was evaluated for each user, the study counterbalanced carryover effects and reduce learning and interference effects. These effects were reduced further by providing a new table with shuffled rows for each query and randomizing the order of the queries the users were asked to perform. To handle fatigue, the users were offered breaks between tasks.

For the tests, the user flow for ARQuery were as follows: the user holded an iPad in camera view in front of a printed sheet of paper with the dataset. A table was detected automatically, and the table inference stage was run, deciphering the "shape" of the table. After this, the user performed their query session, issuing queries over the data by using the gestures described in the previous sections on the iPad touchscreen. The user ended their session once the query tasks was completed.

Performance.

From the study, it was observed that the exemplified system, implemented as the ARQuery system, achieved perceptibly instantaneous performance by providing immediate visual feedback well within 100 ms (miliseconds). From testing of the user query sessions, the study observed that the ARQuery system ran consistently at least 15 fps (67 ms per frame) while providing continuous table tracking during the course of the query session. The study found the performance of the ARQuery system to scale well for increased data size. The study also found the frame rates to stay above 15 fps even when the system doubled the number of table cells to a 12×10 table. At the beginning of the session, the table inference stage (when the ARQuery system gains an understanding of the schema and data in the camera view) was performed and measured to take about 68 ms. During the same stage, as a comparison, a one-time OCR operation (using the Tesseract library) was performed and measured to take an average of 1.3 s; putting the total initial setup time at under 2 seconds. The system-facing latencies for gesture detection and query specification, which includes the updating of the model that results from the specified queries, were found to be negligible (i.e., being under 1 ms per frame).

Comparative Results.

The study measured the time it took users to perform queries with three different methods on three different classes of queries. The three classes of queries tested were Filter, Sort and Group By/Aggregate queries. The users were given three tasks in the form of queries to perform using the three differing mediums. Queries were provided in natural language in both written and spoken form. Time was counted after the query has been read by the user and read out loud and is stopped when the user indicates they have obtained the answer (i.e., says "Done").

This metric (completion time) served as an objective measure of efficacy. In the experiment, the study defined completion time as the time it takes a user to go from a resting state to obtaining the answer to a query (for the ARQuery system, this includes the table inference and other system-facing times listed in the previous paragraph). For each class of query, users were read out loud and shown a query as an English sentence and were measured on how the time it took for the user to return the answer to the query. For Excel, because the spreadsheets were already populated, the study did not consider the spreadsheet input time into the completion times (Excel would be shown to be even slower if that were considered).

FIG. 8 is a diagram showing experimental results of the average completion type for three classes of queries performed with different methods, in accordance with an illustrative embodiment. As shown in FIG. 8, completion time for the ARQuery system was significantly faster than that of the other two methods measured in the comparative study.

Indeed, as shown in FIG. 8, when comparing performance of the ARQuery system to the other two systems/approaches, the study observed that the ARQuery system had a lower average completion time as well as a lower variance, denoting a faster and more consistent user experience, especially for group/aggregate queries. Furthermore, variances typically increased over the three query classes for the 3 different methods but are quite small for the ARQuery method across the board. To show the statistical significance of the differences between the ARQuery system and other systems, the study performed 1-tailed t-tests and confirmed that users perform the queries significantly faster with the ARQuery system as compared with the other two methods with all significance levels (P-values) under 0.05.

Indeed, the ARQuery system's average completion times for all queries tested (Filter, Sort, and Group/Aggregate queries) were lower (i.e., a faster querying experience) and had less variance (i.e., a more consistent querying experience) when compared to the other two query methods (with no tools a.k.a. manual, or with Excel). The study observed variance in completion times across query classes, which correlated with the complexity of the interaction involved: sort queries were the fastest to perform, followed by filter, followed by group by/aggregate. This ordering was consistent with the other methods, with the exception of filter in manual (no tool), which reflects the human ability to quickly find things by browsing. While it seemed at first impression that performing filter and sort queries by hand (manually) might be quicker than using ARQuery, the study results showed otherwise. It is expected the performance to increase as the dataset gets larger and more complex—that is, while ARQuery's expected performance times are expected to remain relatively constant or scale sublinearly, the human cognitive costs in analyzing the larger and more complex data would substantially increase.

From an ingestion standpoint prior to querying, it should be noted that while table inference times (less than 2 s) is included in ARQuery's user completion times, time taken to populate the Excel spreadsheets was not factored in. Doing so would have skewed Excel results to be even slower. It was estimated (using the KLM model and manual tests) that data input would have taken approximately 97 seconds for the data used in the study. Another subjective insight gathered from the user studies was that users were hesitant about their answers when performing manual calculations, and unsure if they had made mistakes. Thus, ARQuery (when used through a touchscreen, or through a headset) had the power to not only expedite user queries, but also to empower them with confidence and reduce possible human error. Overall, the study found the ARQuery system to be performant for typical datasets, and it the fastest way to perform basic analytical queries over real-world data. Further, the study observed that users feel more confident answering questions with ARQuery enabled.

Use Case for Exemplified Augment Reality Query System

FIG. 4 provides a user case scenario for querying the augmented reality query system, e.g., of airport schedules. In FIG. 4, user #1 is a frequent flyer who learns that her United Airlines flight to Monterey (MRY) was cancelled due to bad weather, and that she has been rebooked for the next day. Since arriving a day late would mean she would miss her own keynote talk at CIDR, she decides to purchase a ticket on a different airline. While she has a bevy of airline apps on her phone, the changing weather is triggering new delays—and the most up-to-date information about departing flights is available in front of her on a large and unwieldy terminal display, sorted by departure time. With time being of the essence, user #1 has to manually analyze each display entry to see if it is a suitable candidate for her new flight.

The exemplified system (e.g., 100) would be suitable in this use case by providing querying of any source of structured data—either digital or paper—using a commodity device within seconds or less. Conventional apps and manual interactions may take much longer to execute through conventional user interface, and in many instances, possibly lead to unwanted outcomes (e.g., missing flights in the example of FIG. 2). By providing a fast, real-time interaction experience, the user is beneficially provided an experience akin to that of "hallucinating" a visual data exploration session in the real-world. While this example used the exemplified system through a tablet, a headset (such as Microsoft Hololens) can be used, e.g., for general purpose data exploration as well.

As evidenced by the popularity of AR-based applications such as Pokemon Go®, there is widespread availability of AR-capable hardware and user interest in this hand-less mode of interaction. Similarly, optical character recognition has reached unprecedented quality, and is available in consumer smartphone apps. However, from a querying interface standpoint, several core challenges exist, which the instant system address with exemplified system (e.g., ARQuery). First, unlike objects on a screen, data in the real-world (e.g., paper) persists throughout the query session of the instant system, hence the instant system (e.g., 100) augments existing data instead of replacing it. Second, all queries are performed using direct manipulation of real-world data, meaning that a visual grammar needs to be included for interaction with such data and augmentations. Finally, from a performance standpoint, all interactions provided by the exemplified system (e.g., 100) are performed at a perceptibly instantaneous framerate, e.g., using fast table inference, querying, and result-rendering across the camera's video stream.

Indeed, the exemplified system (e.g., 100) addresses these technical challenges when querying in augmented reality. In some embodiments, the exemplified system (e.g., 100) provides a data model with a result space fit that is suitable for visually representing result sets in augmented reality. In some embodiments, the exemplified system (e.g., 100) further provides an interaction and visualization grammar to query structured data in the real-world using a series of gestures. In some embodiments, the exemplified system (e.g., 100) provides a performant framework that enables such interactions over datasets in real time.

A study conducted of the exemplified augmented reality query system shows that exemplified system (as implemented in the ARQuery system) performed extremely well both in terms of real-time performance and allowing users to perform queries, e.g., 3-10× faster than traditional user interface approaches in performing a similar query.

DISCUSSION

People lives are increasingly deluge in data. In addition to data accessible in the virtual world, people are immersed with structured data in the real-world as well: from paper-printed restaurant menus and nutrition labels, to digital signage-based flight schedules a airports and bus stops. Unlike data that a person owns and controls, real-world data are often truly ad-hoc: that is, people deal with it all the time, but cannot predict exactly when they will need to peruse it. Furthermore, since the displayed data (paper, or digital) is not inside a virtual environment that people control; people quickly "query" such data manually. While such analysis can be trivially represented as analytical queries, people's real-life experiences still involve analyzing through such data and performing mental calculations.

At the same time, augmented reality—a technology to overlay a live view of the physical world with digital information—has gone from a science fiction concept to a commodity, consumer-grade technology used by millions. Augmented Reality (AR) has found a variety of specialized use cases beyond just gaming: areas such as education, medicine, and emergency services have each enabled a completely new form of digital interaction using the camera-based devices. This mode of interaction is expected to rise sharply due to three complementary trends: recent advancements in computer vision & augmented reality research, population-scale availability of camera-enabled hardware, and the affordability of cloud-backed edge devices.

There have been several improvements in computer vision research recently where fairly advanced techniques are now available as consumer-grade hardware and software, and also reliable building blocks for other research. This has triggered a wave of high-quality services (Google Vision, Amazon Rekognition, Clarifai) and open source models/libraries (Tensorflow, Caffe, OpenCV) that can be considered commodity. Furthermore, augmented reality (AR) wearable devices, such as Google Glass, Microsoft HoloLens, and Magic Leap have become available. These devices continually capture and process image and video data and provide pertinent feedback, i.e. the augmentation, through an overlay display. These devices have inspired and unlocked a variety of "camera-first" interaction modalities where the camera is often the primary mode of capture and input—and this paradigm is transferring over to smartphones and tablets as well. AR applications, such as Snapchat, Google Lens, and Amazon Shopping, are bringing a completely new and natural mode of interaction to consumer-grade smartphones and tablets.

Coinciding with these device trends, the number of data-rich applications: end-user activities that are backed by large amounts of data is also rapidly increasing. For example, a simple restaurant lookup on Google Search and Google Maps is now augmented with wait times, popular hours, and visit duration, aggregated from population-scale user location history logs. By considering a user's AR view as a queried view on some data store, this data-rich paradigm brings about a unique opportunity to build compelling querying experiences for end-users. Just as touchscreen interfaces triggered a body of research and products in touch-based querying of structured data, we expect augmented reality to also spur an entirely new body of work.

In all data-rich settings—whether it is consumer, industrial, enterprise, or scientific audiences—there is tremendous opportunity to query the real-world structured data around the user, and augment it with cloud-based data sources.

Exemplified Computing Device

An example computing device upon which embodiments of the invention may be implemented is illustrated in FIG. 9.

For example, each of the system and databases described herein may each be implemented as a computing device, such as computing device 3200. It should be understood that the example computing device 3200 is only one example of a suitable computing environment upon which embodiments of the invention may be implemented. Optionally, the computing device 3200 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media. Exemplified operation and analytics as described herein may be performed on the example computing device or within a distributed computing environments.

In an embodiment, the computing device 3200 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 3200 to provide the functionality of a number of servers that is not directly bound to the number of computers in the computing device 3200. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In its most basic configuration, computing device 3200 typically includes at least one processing unit 3220 and system memory 3230. Depending on the exact configuration and type of computing device, system memory 3230 may be volatile (such as random access memory (RAM)), non-volatile (such as read-only memory (ROM), flash memory, etc.), or some combination of the two. This most basic configuration is illustrated in FIG. 8 by dashed line 3210. The processing unit 3220 may be a standard programmable processor that performs arithmetic and logic operations necessary for operation of the computing device 3200. While only one processing unit 3220 is shown, multiple processors may be present. Thus, while instructions may be discussed as executed by a processor, the instructions may be executed simultaneously, serially, or otherwise executed by one or multiple processors. The computing device 3200 may also include a bus or other communication mechanism for communicating information among various components of the computing device 3200.

Computing device 3200 may have additional features/functionality. For example, computing device 3200 may include additional storage such as removable storage 3240 and non-removable storage 3250 including, but not limited to, magnetic or optical disks or tapes. Computing device 3200 may also contain network connection(s) 3280 that allow the device to communicate with other devices such as over the communication pathways described herein. The network connection(s) 3280 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 3200 may also have input device(s) 3270 such as keyboards, keypads, switches, dials, mice, track balls, touch screens, voice recognizers, card readers, paper tape readers, or other well-known input devices. Output device(s) 3260 such as printers, video monitors, liquid crystal displays (LCDs), touch screen displays, displays, speakers, etc. may also be included. The additional devices may be connected to the bus in order to facilitate communication of data among the components of the computing device 3200. All these devices are well known in the art and need not be discussed at length here.

The processing unit 3220 may be configured to execute program code encoded in tangible, computer-readable media. Tangible, computer-readable media refers to any media that is capable of providing data that causes the computing device 3200 (i.e., a machine) to operate in a particular fashion. Various computer-readable media may be utilized to provide instructions to the processing unit 3220 for execution. Example tangible, computer-readable media may include, but is not limited to, volatile media, non-volatile media, removable media and non-removable media implemented in any method or technology for storage of information such as computer readable instructions, data structures, program modules or other data. System memory 3230, removable storage 3240, and non-removable storage 3250 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 3220 may execute program code stored in the system memory 3230. For example, the bus may carry data to the system memory 3230, from which the processing unit 3220 receives and executes instructions. The data received by the system memory 3230 may optionally be stored on the removable storage 3240 or the non-removable storage 3250 before or after execution by the processing unit 3220.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Use of the phrase "and/or" indicates that anyone or any combination of a list of options can be used. For example, "A, B, and/or C" means "A", or "B", or "C", or "A and B", or "A and C", or "B and C", or "A and B and C". As used in the specification, the singular forms "a," "an" and "the" include plural referents unless the context clearly dictates otherwise. Moreover, titles or subtitles may be used in this specification for the convenience of a reader, which shall have no influence on the scope of the disclosed technology. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It is contemplated that the disclosure herein can be used in the processing of typical datasets and traditional queries. The disclosure herein can also be used to handle relational operators and lookup-based joins. In some embodiments, the exemplified system may be used to perform truly binary operations such as joins can be added on by enabling ARQuery on multiple juxtaposed objects (e.g., holding a calorie table next to a restaurant menu), in a gesture-driven action can be easy-to-use for non-expert users. Further, the disclosure herein can be used for relational model, nested relational, hierarchical, and other data models. In some embodiments, the exemplified system may create a polygon-to-data inference mechanism and an interaction mapping for each data model. The disclosure herein may support 2-D visualization and/or 3-D visualizations (e.g., histograms and pie charts, etc.), and an interaction grammar or heuristic can be articulated about which visualization to generate for each column. The disclosure herein may be used to allow users to map result visualizations onto real-world 2-D and 3-D spaces, allowing for immersive, context-specific analytics.

Throughout this application, and at the end thereof, various publications are referenced. The disclosures of these publications in their entireties are hereby incorporated by reference into this application in order to more fully describe the state of the art to which the methods and systems pertain.

What is claimed is:

1. A method of operating an augmented reality system, the method comprising:
   receiving, by a processor, a video stream from a video capture sensor;
   determining, by the processor, a plurality of structured data elements in one or more frames of the video stream by (i) detecting, by the processor, a table schema in the one or more frames of the video stream and (ii) extracting, by the processor, elements in a query space data representation of the table schema;
   presenting, by the processor, via a graphical user interface, a first visual output corresponding to the video stream and a second visual output having a plurality of augmented data elements associated with the determined plurality of structured data elements, wherein the second visual output includes the extracted elements in a corresponding presentation model;
   receiving, by the processor, a gesture input on an element of the query space data representation of the table schema; and
   performing, by the processor, a query in the query space data representation of the received gesture.

2. The method of claim 1, wherein the query is selected from the group consisting of a grouping command, an exclude command, an append row command, an associate command, an append and aggregate command, and a sorting command.

3. The method of claim 1, wherein the step of determining the plurality of structured data elements in the frame further comprises:
   detecting, by the processor, data elements in the one or more frames;
   segmenting, by the processor, the data elements from the frame; and
   performing, by the processor, optical character recognition operation of the segmented data elements to generate a plurality of arrayed text data.

4. The method of claim 3, wherein the step of detecting data elements in the one or more frames comprises:
   detecting at least one of parallel lines, straight lines, and co-aligned text groups in a frame of the one or more frames.

5. The method of claim 1, further comprising:
   determining, by the processor, a first set of structured data elements and a second set of structured data elements in one or more frames of the video stream, wherein the first set of structured data elements correspond to an attribute type, and wherein the second set of structured data elements correspond to a data type;
   receiving, by processor, via the graphical user interface, a first gesture query input corresponding to a first augmented data element of the plurality of augmented data elements, wherein the first augmented data element is associated with the first set of structured data elements corresponding to the attribute type;

determining, by the processor, one or more structured data elements of the second set of structured data elements associated with the first augmented data element;

rendering the one or more structured data elements of the second set of structured data elements as an augmented object associated with the first augmented data element; and presenting, by the processor, via the graphical user interface, the rendered augmented object of the one or more structured data elements of the second set of structured data elements.

6. The method of claim 5, further comprising:
generating, by the processor, a result of a mathematical operator performed on values derived from the one or more structured data elements of the second set of structured data elements; and presenting, by the processor, via the graphical user interface, the result of the mathematical operator.

7. The method of claim 6, further comprising:
generating, by the processor, a second result of a second mathematical operator performed on second set of values derived from the one or more structured data elements of a second group of structured data elements; and co-presenting, by the processor, via the graphical user interface, the second result of the second mathematical operator next to the result of the mathematical operator.

8. The method of claim 7, wherein the result of the mathematical operator is rendered with a first color value and the second result of the second mathematical operator is rendered with a second color value.

9. The method of claim 6, wherein the mathematical operator is selected from group consisting of a maximum operator, a minimum operator, an average (mean) operator, and a mode operator.

10. The method of claim 1, further comprising:
finding, by the processor, contours of table cells in the one or more frames;

sub-selecting, by the processor, a plurality of corner elements of the table cells using an optical flow tracking operation; and updating, by the processor, rendered augmented object of the one or more structured data elements based on a grounding space derived from the optical flow tracking operation.

11. The method of claim 10, wherein the optical flow tracking operation is performed using the Lucas-Kanade method.

12. The method of claim 1, further comprising:
determining, by the processor, a first set of structured data elements according to a data model;

parameterizing, by the processor, the first set of structured data elements to a pre-defined encoding space, wherein the parameterized first set of structured data elements are presented via a pre-defined presentation model.

13. The method of claim 12, wherein the parameterized first set of structured data elements are presented via a pre-defined presentation model by encoding the parameterized first set of structured data elements to a pre-defined grounding space, wherein the encoding space is independent of the grounding space.

14. The method of claim 1, further comprising:
evaluating, by the processor, a plurality of interactive visual querying grammar; and executing, by the processor, an associated operator corresponding to a determined interactive visual querying grammar.

15. The method of claim 1, further comprising:
tracking, by the processor, the extracted elements in the query space data representation.

16. The method of claim 1, wherein the plurality of augmented data elements of the second visual output are presented as augmented highlights selected from the group consisting of occlusion masks, colors, and text annotations.

17. The method of claim 1, wherein the processor and the video capture sensor are part of a smart phone, a tablet, or a wearable headset.

18. A system comprising:
a video capture sensor;
a display;
a processor; and
a memory having instructions stored thereon, wherein execution of the instructions cause the processor to:
receive a video stream from the video capture sensor;
determine a plurality of structured data elements in one or more frames of the video stream by (i) detecting a table schema in the one or more frames of the video stream and (ii) extracting elements in a query space data representation of the table schema;
present, via a graphical user interface, on the display, a first visual output corresponding to the video stream and a second visual output having a plurality of augmented data elements associated with the determined plurality of structured data elements, wherein the second visual output includes the extracted elements in a corresponding presentation model;
receive a gesture input on an element of the query space data representation of the table schema; and
perform a query in the query space data representation of the received gesture.

19. A non-transitory computer readable medium comprising having instructions stored thereon, wherein execution of the instructions by a processor of a computing system cause the processor to:
receive a video stream from a video capture sensor of the computing system;
determine a plurality of structured data elements in one or more frames of the video stream by (i) detecting a table schema in the one or more frames of the video stream and (ii) extracting elements in a query space data representation of the table schema;
present, via a graphical user interface, on a display of the computing system, a first visual output corresponding to the video stream and a second visual output having a plurality of augmented data elements associated with the determined plurality of structured data elements;
receive a gesture input on an element of the query space data representation of the table schema; and
perform a query in the query space data representation of the received gesture.

* * * * *